United States Patent [19]
Yumoto et al.

[11] Patent Number: 5,640,525
[45] Date of Patent: Jun. 17, 1997

[54] DATA-DRIVEN INFORMATION PROCESSING DEVICES

[75] Inventors: Manabu Yumoto; Tsuyoshi Muramatsu, both of Nara, Japan

[73] Assignee: Sharp Kabushiki Kaisha, Osaka, Japan

[21] Appl. No.: 488,433

[22] Filed: Jun. 7, 1995

[30] Foreign Application Priority Data

Mar. 31, 1995 [JP] Japan ................................. 7-076574

[51] Int. Cl.$^6$ ..................................................... G06F 9/06
[52] U.S. Cl. ........................................................... 395/377
[58] Field of Search .................. 364/DIG. 1 MS File, 364/DIG. 2 MS File; 395/381, 390, 376, 377, 800, 728, 775

[56] References Cited

U.S. PATENT DOCUMENTS

| | | | |
|---|---|---|---|
| 5,115,510 | 5/1992 | Toshiya et al. | 395/775 |
| 5,241,683 | 8/1993 | Toshiya | 395/800 |
| 5,404,539 | 4/1995 | Manabu | 395/728 |
| 5,511,215 | 4/1996 | Toshiaki et al. | 395/800 |

FOREIGN PATENT DOCUMENTS 5-20152  3/1993  Japan .

OTHER PUBLICATIONS

Iwanami Shoten "Information Science Dictionary" (May 1990), pp. 494–497.

Primary Examiner—Robert B. Harrell

[57] ABSTRACT

A data-driven information processing device includes a program storage mechanism, a data pair generation mechanism, an operation processing mechanism, a circular pipeline for data transfer among the program storage mechanism, the pair data generation mechanism and the operation processing mechanism in a token format, and a data input/output control circuit connected to the circular pipeline. The data pair generation mechanism carries out a generation process of a data pair in a different manner depending upon whether the argument data companion to the argument data in an applied token is a constant or not. The data pair generation mechanism may include, for example, a constant data processing unit and a dynamic data pair generation mechanism. The data pair generation mechanism selects constant data output from the constant data processing unit when the argument data companion to the argument data in an applied token is a constant, and selects the argument data companion to an output of the dynamic data pair generation mechanism otherwise. The selected data is used to assemble a token. A plurality of dynamic data pair generation mechanisms are included, and an apparatus is disclosed for operating the dynamic data pair generation mechanism in an interleaving manner.

7 Claims, 33 Drawing Sheets

FIG. 14    PRIOR ART

```
     53 52 51 50    42 41  36 35              12 11       0
    ┌──┬──┬──┬────────┬──────┬──────────────────┬──────────┐
    │DC│DC│DC│  OPC   │  ND  │        GN        │    LD    │
    └──┴──┴──┴────────┴──────┴──────────────────┴──────────┘
```
                                                        ↙510

FIG. 15    PRIOR ART

```
   65          54 53 52 51 50    42 41  36 35       12 11    0
  ┌──────────────┬──┬──┬──┬────────┬──────┬──────────┬────────┐
  │      RD      │DC│DC│DC│  OPC   │  ND  │    GN    │   LD   │
  └──────────────┴──┴──┴──┴────────┴──────┴──────────┴────────┘
```
                                                        ↙512

DATA-DRIVEN INFORMATION PROCESSING DEVICES

BACKGROUND OF THE INVENTION

1. Field of the Invention

The present invention relates to the field of information processing, and more particularly to a data-driven information processing device that carries out execution of an instruction when all data required for the execution of an instruction are available.

2. Description

It is considered that the data driven principle is essentially a natural information processing system. A data-driven processor with this data driven principle as the basic principle is a general term of a series of processors developed from a research plan directed to effectively execute a subject program directly converted from a high level specification description that can be executed.

The data driven principle is set forth in the following. A program is formed of a plurality of instructions. Each instruction attains an executable state when all argument data required for each execution have arrived in the form of a token (data packet). An instruction attaining an executable state is provided to an operation processing mechanism together with its argument data and destination of the executed result.

The process of determination of whether an instruction attains an executable state or not and sending an instruction, if executable, to an operation processing mechanism together with the argument data and destination of result is carried out by a firing control mechanism.

In an operation processing mechanism, an applied instruction is executed, and the result is transferred according to its destination in the format of a token as the argument data of the next instruction to be carried out.

Such an operation mechanism is called a data driven system since execution of an instruction is driven upon arrival of a token including data. FIG. 1 shows such the data driven principle. Referring to the left portion of FIG. 1, when an instruction requires two inputs, there are two input arcs at the nodes corresponding to this instruction. The number of output arcs is 1. When a token arrives to this node from the left and right input arcs, that instruction is fired, whereby data of the operation result (instruction executed result) is sent to the output arc as an output token as shown in the right portion of FIG. 1.

This data driven principle is described in, for example, "Joho Kagaku Jiten" (published by Iwanami Shoten, 1994), pp. 494–497.

FIG. 2 schematically shows a structure of a conventional data-driven processor. This data-driven processor 400 includes a dynamic firing control (matching) mechanism (FC: Firing Control) 402, an operation processing mechanism (FP: Function Processor) 108, a program storage mechanism (PS: Program Store) 104, and a data input/output control unit (I/O: Input Output Control) 102. These basic functions are connected via a circular pipeline.

A cascade connection of a temporary storage mechanism by a hand shake type data transfer control system shown in FIG. 3 is employed as the basic structure for data transfer and processing by this circular pipeline.

Referring to FIG. 3, the data transfer mechanism includes data latches 410 and 412 provided preceding and succeeding a hardware primitive 414, C-elements 406 and 408 for carrying out hand shake type data transfer control to provide a timing signal for data transfer with respect to data latches 410 and 412. By a continuous provision of such structures, data is transferred sequentially through each data latch, and a process with respect that data is carried out by hardware primitive 414.

A data packet which is a working packet of a physical level is selected autonomously by a self-route select function in this structure to be subjected to a process sequentially by each functional element. By passing through this flow path, execution of information processing proceeds autonomously. By introducing such a system, a system bus, a system clock, central control mechanism, and the like are all removed from a data-driven processor. In other words, control of the entire system is completely decentralized.

The processing speed of such a data-driven processor essentially depends upon the internal circuit structure of the C-element (self timing type transfer control element) shown in FIG. 3 and the natural scientific characteristics of a device. The internal circuit structure of C-element 406 (or 408) is shown in FIG. 4. This exemplified C-element shown in FIG. 4 determines the data transfer timing using the preceding and succeeding C-elements and signals CI, CO, RI, and RO. In response, a control pulse CP of the data latch is output.

Therefore, by determining the internal circuit structure of the C-element, the time required for processing in an interstage process between a cascade-connected network of a temporary storage mechanism by a hand shake type data transfer control system under this condition can be defined.

In a general operation process of a data-driven processor, the operation is divided into operation elements of lower levels, which are processed in a plurality of stages. This is called a pipeline division process.

However, such a pipeline division process cannot be carried out in dynamic firing control mechanism 402 shown in FIG. 2. The reason will be described hereinafter.

In a data-driven processor, the execution rate of a program and the amount of hardware of the entire computer are greatly dependent upon how the firing control mechanism of argument data applied as a packet is realized. More specifically, reduction of the hardware required for the firing control mechanism and the processing time of matching are one of the most important issues in the system design of a data-driven processor.

A firing control mechanism basically requires the following three functions.

(1) Determination is made whether an input packet is argument data of a 2-input instruction. When the packet is directed to a 1-input instruction, it bypasses the process for matching.

(2) When the input packet is directed to a 2-input instruction, determination is made whether the packet of the other party has already arrived or not.

(3) If the packet of the other party has already arrived, it is read out as the other argument data, and then transferred to the operation processing mechanism together with the input packet. When the packet of the other party has not yet arrived, the input packet is stored in the matching memory.

An input packet towards a data-driven processor is formed of a destination specifying portion and a data portion. Structures of a data packet are shown in FIGS. 14 and 15. FIG. 14 shows the format of a packet 510 in a path other than that starting from a firing control mechanism to an operation processing mechanism. FIG. 15 shows the format of a data packet 512 transferred from a firing control mechanism to an operation processing mechanism.

Referring to the exemplary formats of FIGS. 14 and 15, the destination specifying portion of an input packet towards a data-driven processor generally includes destination information for identifying a matching party such as an element processor number, an instruction storage address (node number) ND, generation number GN and the like, as well as other information such as the type of packet and matching conditions or the like. The data portion is generally formed of the data type and data per se. In FIGS. 14 and 15, the left data is indicated as LD and the right data is indicated as RD. In a firing control mechanism, the above-described firing control function is carried out using this destination information.

A logic circuit diagram of a firing control mechanism is shown in FIGS. 6 and 7. The circuits shown in FIGS. 6 and 7 are joined as shown in FIG. 5. This firing control mechanism is firing control mechanism 402 shown in FIG. 2.

Referring to FIGS. 6 and 7, firing control mechanism 402 includes C-elements 420, 422, 424, 426, 428 and 430, data latches 440, 442, 444, 446, 448, 450, 452 and 454, an FC-adapted 2-input instruction execution packet detection unit 254, a firing control main processing unit 188, and logic gate circuits 460, 462, and 464 for carrying out various functions such as discarding and erasing a data packet, and handshake type transfer control.

A process in dynamic firing control mechanism 402 shown in FIGS. 6 and 7 is carried out as set forth in the following. When a data packet is latched in data latch 440, FC-adapted 2-input instruction execution packet detection unit 254 detects whether this packet is an FC-adapted 2-input instruction execution packet and generates a flag FR representing the determination result. Flag FR is provided to firing control main processing unit 188 with the input packet data.

The data processed by firing control main processing unit 188 and the input packet data are selectively extracted and discarded by data latches 450, 452, and 454 to result in an output packet. This output packet is provided from data latch 454.

A logic circuit diagram of firing control main processing unit 188 is shown in FIGS. 9 and 10 which are to be joined as shown in FIG. 8.

Referring to FIGS. 9 and 10, firing control main processing unit 188 includes C-element for firing control main processing unit 270 and C-element 288, data latches 276, 280, 286 and 296, an access adjustment unit 282 for a matching memory, a matching memory 284, a hash collision detection unit 290, a firing detail detection unit 292, a destination information select unit 294, and inverters 272 and 274.

Firing control main processing unit 188 operates as set forth in the following. Flag FR indicating whether the input packet is a 2-input instruction execution packet or not and the required data from the data packet provided to firing control mechanism are applied to firing control main processing unit 188. The input packet is passed through if it is a 1-input packet. More specifically, when a signal value applied to a WWB terminal of C-element for firing control main processing unit 270 shown in FIG. 9 takes a value indicating a 1-input packet, a short interstage processing time mode is selected, and the input packet is subjected to a through process.

The following process must be carried out in one stage of an interstage process when the input packet is a 2-input instruction execution packet. The process includes a reading and writing process from and to a matching memory, and a process associated thereto. The details will be described hereinafter.

Data is read out from matching memory 284 using a pair of bits in the destination specifying portion of the input packet as the address. The structure of the data in matching memory 184 is shown in FIG. 11.

Hash collision detection unit 290 compares the hash overflow destination specifying portion in matching memory 284 with the hash overflow destination specifying portion in the input packet to determine whether a hash collision has occurred or not.

Firing detail detection unit 292 generates a flag triggering a firing control process when the input packet is a 2-input instruction execution packet, no hash collision has occurred, and the data read out from the memory is valid (PRE flag=1). This flag is provided to matching memory 284 via matching memory access adjusting unit 282.

Then, the data in the input packet and data read out from matching memory 284 are collected and output as a packet. Also, the data in the appropriate address of matching memory 284 is invalidated. More specifically, the value of the valid (PRE) flag of that address is nullified (0). Determination can be made whether data is valid or not by identifying the value of this PRE flag at the time of readout.

When the input packet is a 2-input instruction execution packet, the data read out from matching memory 284 is valid, and hash collision has occurred, a packet is output with a valid value of the hash collision flag. This packet circulates the circular pipeline to be provided again to the firing control mechanism, whereby a firing processing is carried out again.

When the input packet is a 2-input instruction execution packets, and the data read out from matching memory 284 is invalid, the data value in the input packet is written into an appropriate address of matching memory 284. Here, the PRE flag of this address is set valid.

The above-described process of a firing detail detection, reading out of the data from a matching memory for hash collision detection, and data writing for various processes must be carried out within one stage of an interstage process. Therefore, and also since the physical propagation delay time of a logic element is finite, the interstage processing time required for the above-described process including the reading/writing operation of data from a matching memory must be set longer than those of other standard processing units. Other standard processing units include processing units capable of a pipeline division process.

C-element for firing control main processing unit 270 shown in FIG. 9 is a C-element provided for adjustment of such a processing time. A logic circuit diagram of C-element 270 is shown in FIG. 13.

Referring to FIG. 13, C-element 270 includes C-elements 470 and 472, data latches 480, 482 and 484, logic gate circuits 490, 492, 494, 496, 498, 500, 502, 504 and 506. The manner of connection therebetween is as illustrated.

When a packet requiring a writing operation towards matching memory 284 is processed in the circuit of FIG. 13, i.e. when the input to terminal WWB is 0, a long interstage processing time mode is selected. It is to be noted that terminal WWB receives an inverted value of flag FR by inverter 274 as shown in FIG. 9. This means that the case where the signal of terminal WWB indicates 0 is equivalent to the case where the input packet is a 2-input instruction execution packet.

When a packet that does not require writing to match memory 284 is processed, i.e. the input to terminal WWB is 1, the short interstage processing time mode is selected.

More specifically, when the input packet is a 1-input instruction packet, an interstage processing time of a standard C-element is selected.

In view of the foregoing, there is a possibility that the process in firing control main processing unit 188 becomes the bottleneck in the overall processing time of the entire driven type processor depending upon how the long interstage processing time mode is selected over time. For example, when a long interstage processing time mode is continuously selected, the processing time required for the entire system is rate-determined depending upon the processing speed of firing control main processing unit 188.

This fact pertains even when the mechanism related to hash collision of the firing control mechanism is removed. An example of a structure of a matching memory in such case is shown as a matching memory 284a in FIG. 12.

The tendency of the amount of hardware required for the structure of a firing control mechanism can be envisioned as set forth in the following. In a firing control mechanism, matching memory 284 (refer to FIGS. 11 and 12) for generating a data pair is used. The memory capacity required for this memory is in principle:

$$2^{b1} \times b2$$

where b1 and b2 indicate the number of bits of the destination specifying portion and the data portion, respectively. The required memory capacity increases in an exponential functional manner in response to increase of the number of bits of the destination specifying unit.

For firing-control in a firing control mechanism, the processes of reading out data from a matching memory, writing data into a memory when there is no matching data, and a process associated thereto must be carried out in one stage of a pipeline. Therefore, this process may become the bottleneck of the process of the entire data-driven processor. It is therefore desirable to improve the entire processing rate by carrying out the process as fast as possible. It is also desirable to suppress the increase of hardware as low as possible required for the structure of the firing control mechanism. It is most preferable to reduce the amount of hardware.

SUMMARY OF THE INVENTION

In view of the foregoing, an object of the present invention is to provide a data-driven information processing device that can operate at high speed.

Another object of the present invention is to provide a data-driven information processing device that can operate at high speed with a small amount of hardware.

A further object of the present invention is to provide a data-driven processor having a wide range of applications and that can operate at high speed with a small amount of hardware.

Still another object of the present invention is to provide a data-driven information processing device that can operate efficiently when receiving a data packet with constant data as argument data.

A data-driven information processing device according to the present invention includes a program storage mechanism for storing a data flow program, a data pair generation mechanism receiving an output of the program storage mechanism for providing an instruction that has all argument data available for execution together with argument data and thereof destination information of the execution result, an operation processing mechanism receiving an output of the data pair generation mechanism for carrying out an applied instruction and providing the result together with an applied destination information, a circular pipeline for transferring data among the program storage mechanism, the data pair generation mechanism and the operation processing mechanism in a token format, and a data input/output control circuit connected to the circular pipeline.

The data pair generation mechanism generates a data pair in a different manner depending upon whether the argument data which is the companion to the argument data in the applied token is a constant or not. The amount of processing required for the data pair generation process is lower when the argument data is a constant. By carrying out this process independent of other data pair generation processes, the amount of processing required for general data pair generation process can be reduced. Therefore, the load of the data pair generation process is reduced in the data-driven information processing device. As a result, the speed of the data pair generation process that rate-determines the entire processing speed can be improved. Thus, a data-driven information processing device that can operate at higher speed can be provided.

The data pair generation mechanism may include, for example, a constant data processing unit, and a dynamic data pair generation mechanism. The data pair generation mechanism selects the constant data output from the constant data processing unit when the argument data which is a companion to the argument data in the applied token is constant, otherwise selects the companion argument data output from the dynamic data pair generation mechanism, whereby a token is assembled. The constant data processing unit may include a constant data memory storing constant data used in an instruction and a valid flag thereof in an address calculated according to the node number applied to the instruction in the data flow program, and a circuit for addressing the constant memory according to the node number in the destination information of the applied token for reading out the constant data and valid flag thereof from the constant data memory.

More preferably, the data-driven information processing device includes a circuit responsive to an instruction code included in an applied token being a constant data memory load instruction for writing data included in the applied token into an address in the constant data memory specified according to a node number included in the applied token.

A data-driven information processing device according to another aspect of the present invention includes a program storage mechanism for storing a data flow program, a data pair generation mechanism receiving an output of the program storage mechanism for providing an instruction having all argument data required for execution available together with that argument data and destination information of the execution result, an operation processing mechanism receiving an output of the data pair generation mechanism for carrying out an applied instruction and providing the executed result with the applied destination information, a circular pipeline for data transfer among the program storage mechanism, the data pair generation mechanism, and the operation processing mechanism in a token format, and a data input/output control circuit connected to the circular pipeline.

The data pair generation mechanism includes a plurality of dynamic data pair generation mechanisms. Each of the plurality of dynamic data pair generation mechanisms includes a matching memory for carrying out a matching operation of argument data for execution of an instruction according to destination information in an applied token. Each dynamic data pair generation mechanism provides an instruction identified as having all the argument data required for execution available and argument data in an applied token to the destination of the execution result, and, when argument data companion to the argument data in the applied token is matched, providing that paired-argument data.

The data pair generation mechanism may further include an interleave flag and address generation circuit, and a data select circuit. The interleave flag and address generation circuit generates select information indicating which of the plurality of dynamic data pair generation mechanism is to be selected and destination information included in the applied token according to an externally applied interleave specification parameter for interleaving and using the plurality of dynamic data pair generation mechanisms, and an address used for matching data in the selected dynamic data pair generation mechanism. The data select circuit selectively operates any of the plurality of dynamic data pair generation mechanisms according to the information in the applied token and the select information provided from the interleave flag and address generation circuit, and assembles a token on the basis of that output and the information in the applied token. The token is output.

According to this data-driven information processing device, a plurality of dynamic data pair generation mechanisms can be interleaved and used. The load of the plurality of dynamic data pair generation mechanisms can be divided by providing a data packet to the data-driven information processing device at in appropriate order. Thus, a data-driven information processing device that can operate at further high speed can be provided.

A data-driven information processing device according to a further aspect of the present invention includes a program storage mechanism for storing a data flow program, a data pair generation mechanism receiving an output of the program storage mechanism for providing an instruction having all the argument data required for execution available together with that argument data and the destination information of the execution result, an operation processing mechanism receiving an output of the data pair generation mechanism for carrying out an applied instruction and providing the execution result together with the applied destination information, a circular pipeline for data transfer among the data storage mechanism, the data pair generation mechanism, and the operation processing mechanism in a token format, and a data input/output control circuit connected to the circular pipeline.

The data pair generation mechanism includes a constant data processing unit for providing constant data and information representing whether the constant data is valid or not according to the destination information in the applied token, and a plurality of dynamic data pair generation mechanisms.

Each of the plurality of dynamic pair generation mechanisms includes a matching memory for matching argument data required for execution of an instruction according to destination information in an applied token. Each dynamic data generation mechanism provides an instruction identified as having all argument data required for execution available and argument data in an applied token together with the destination of the execution result, and, when the argument data companion to the argument data in the applied token is matched, providing that paired argument data. The data pair generation mechanism further includes a select detection unit, an interleave flag and address generation circuit, and a data select circuit.

The select detection unit determines which should be made valid the constant data output from the constant data processing unit or the companion argument data output from the plurality of dynamic data pair generation mechanisms according to the information in the applied token and the output of the constant data processing unit. The interleave flag and address generation circuit generates select information representing which of the plurality of dynamic data pair generation mechanisms is to be selected and an address used for data matching in the selected dynamic pair generation mechanism according to an externally applied interleave specifying parameter for interleaving and using the plurality of dynamic data pair generation mechanisms and the destination information included in the applied token. The data select circuit selectively operates the plurality of dynamic data pair generation mechanisms and the constant data processing unit according to the information of the applied token, the select information provided from the interleave flag and address generation circuit and the output of the select detection unit for assembling and providing a token based on that output and the information of the applied token.

In this data-driven information processing device, the dynamic data pair generation mechanism operates only when information indicating that the constant data is invalid is provided from the constant data processing unit, and does not operate when information is output indicating that the constant data is valid. Therefore, the amount of processing of the dynamic data pair generation mechanism is reduced. Furthermore, the plurality of dynamic data pair generation mechanisms in the dynamic data pair generation mechanism can be used in an interleaving manner. By providing a data packet to the data-driven information processing device in an appropriate order, the amount of processing of each dynamic data pair generation mechanism is reduced, and the load of the plurality of dynamic data pair generation mechanism included in the dynamic data pair generation mechanisms can be divided. Thus, a data-driven information processing device is provided that operates at higher speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 schematically shows a structure of another example of matching memory 284a.

FIG. 14 schematically shows a structure of a data packet circulating a circular pipeline.

FIG. 15 schematically shows a structure of a data packet output from a firing control mechanism.

DETAILED DESCRIPTION OF THE PREFERRED EMBODIMENTS

First Embodiment

Figure 16:
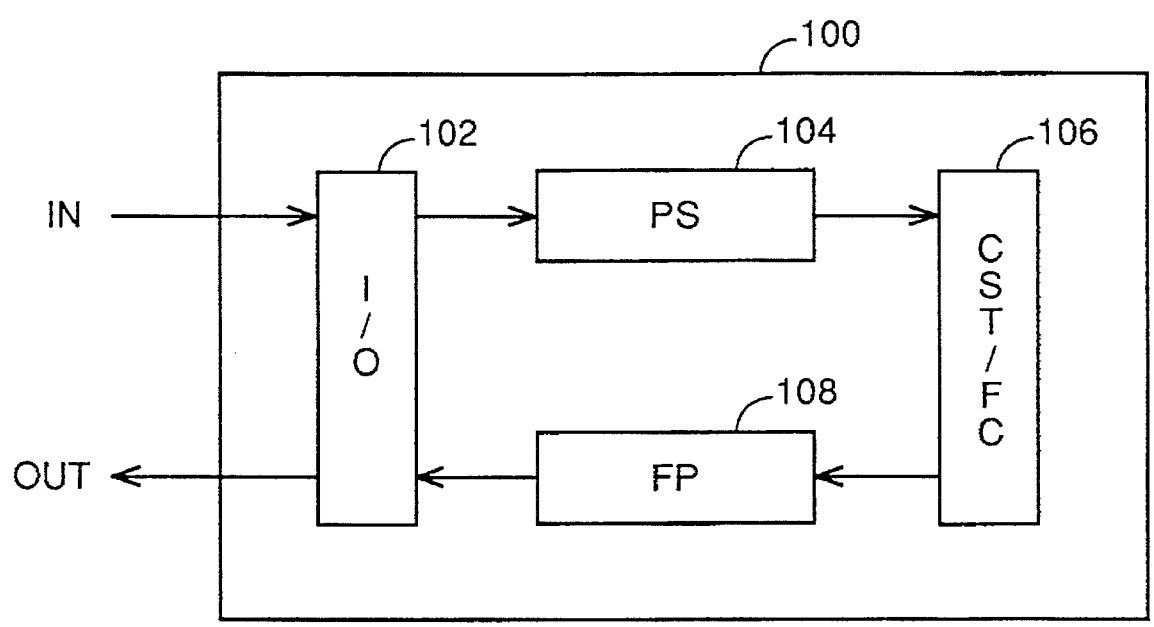
FIG. 16 schematically shows a structure of a data-driven processor according to a first embodiment of the present invention.

Referring to FIG. 16, a data-driven processor 100 includes a constant data memory/dynamic firing control mechanism (CST/FC) 106 in addition to a data input/output control unit 102, a program storage mechanism 104, and an operation processing mechanism 108 similar to those of the prior art. Each of the basic functions are connected by a circular pipeline.

Figure 17:
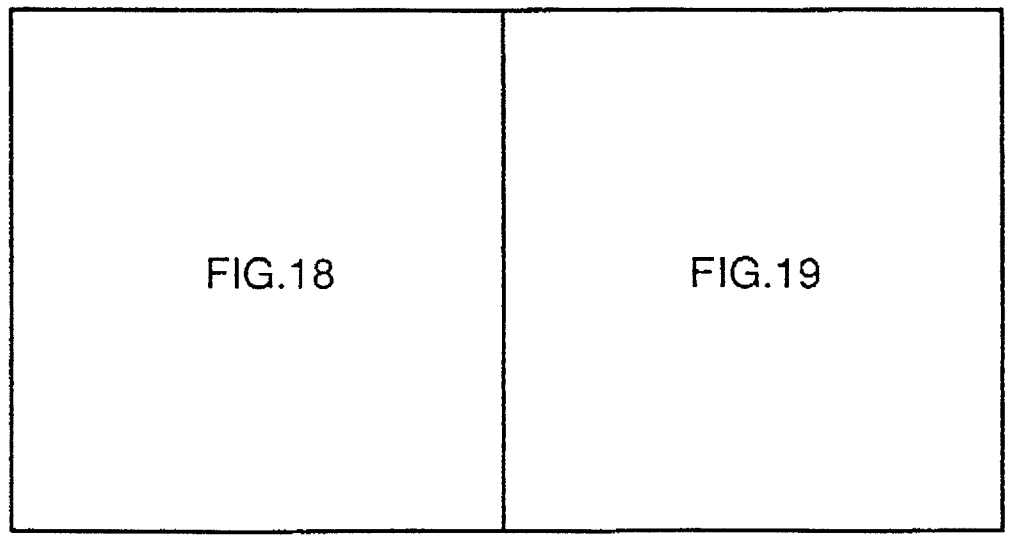
FIG. 17 schematically shows the relationship between FIGS. 18 and 19.
Figure 18:
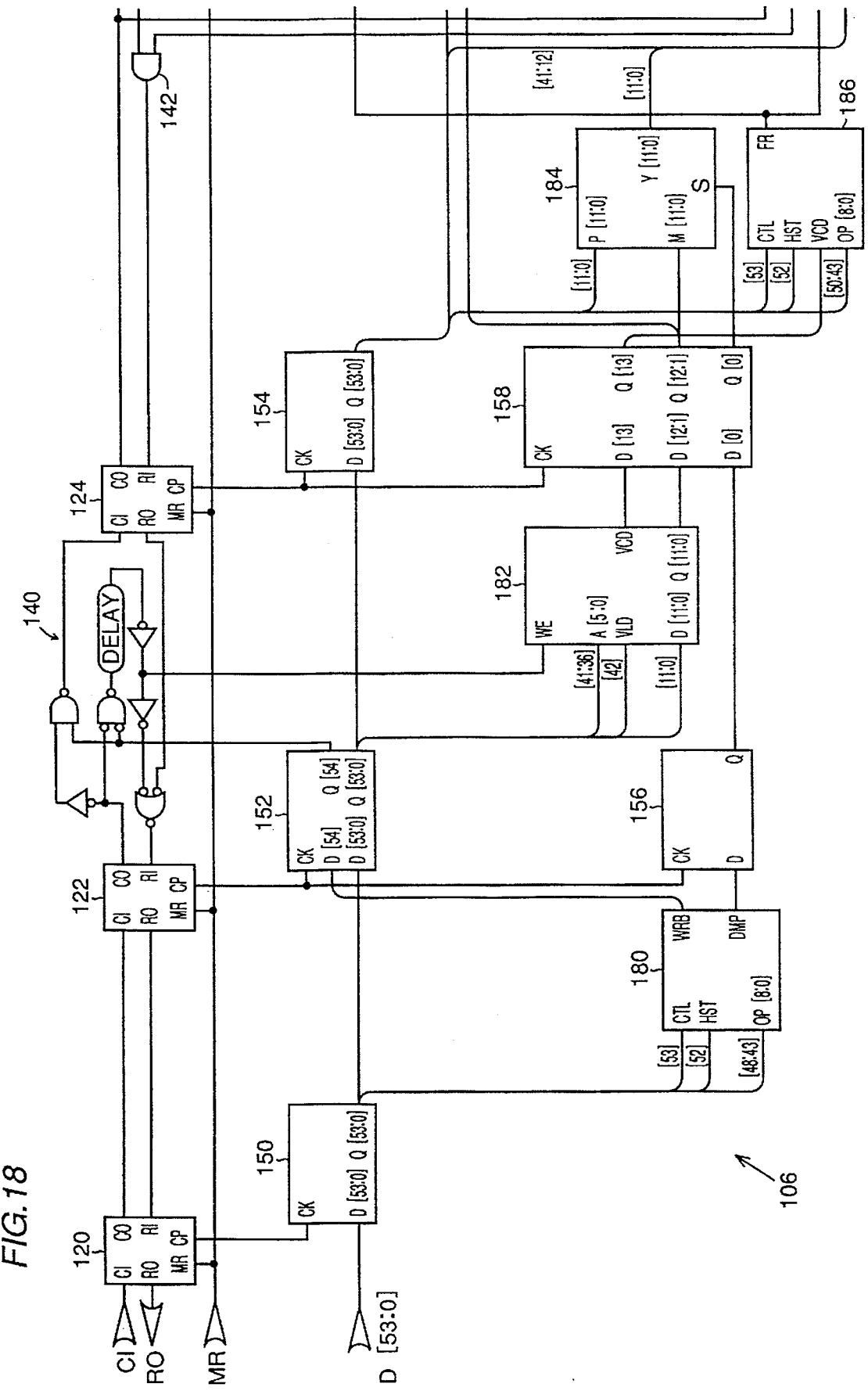
FIGS. 18 and 19 show one portion and the other portion, respectively, of the structure of a constant data memory/dynamic firing control mechanism 106 of the first embodiment.
Figure 19:
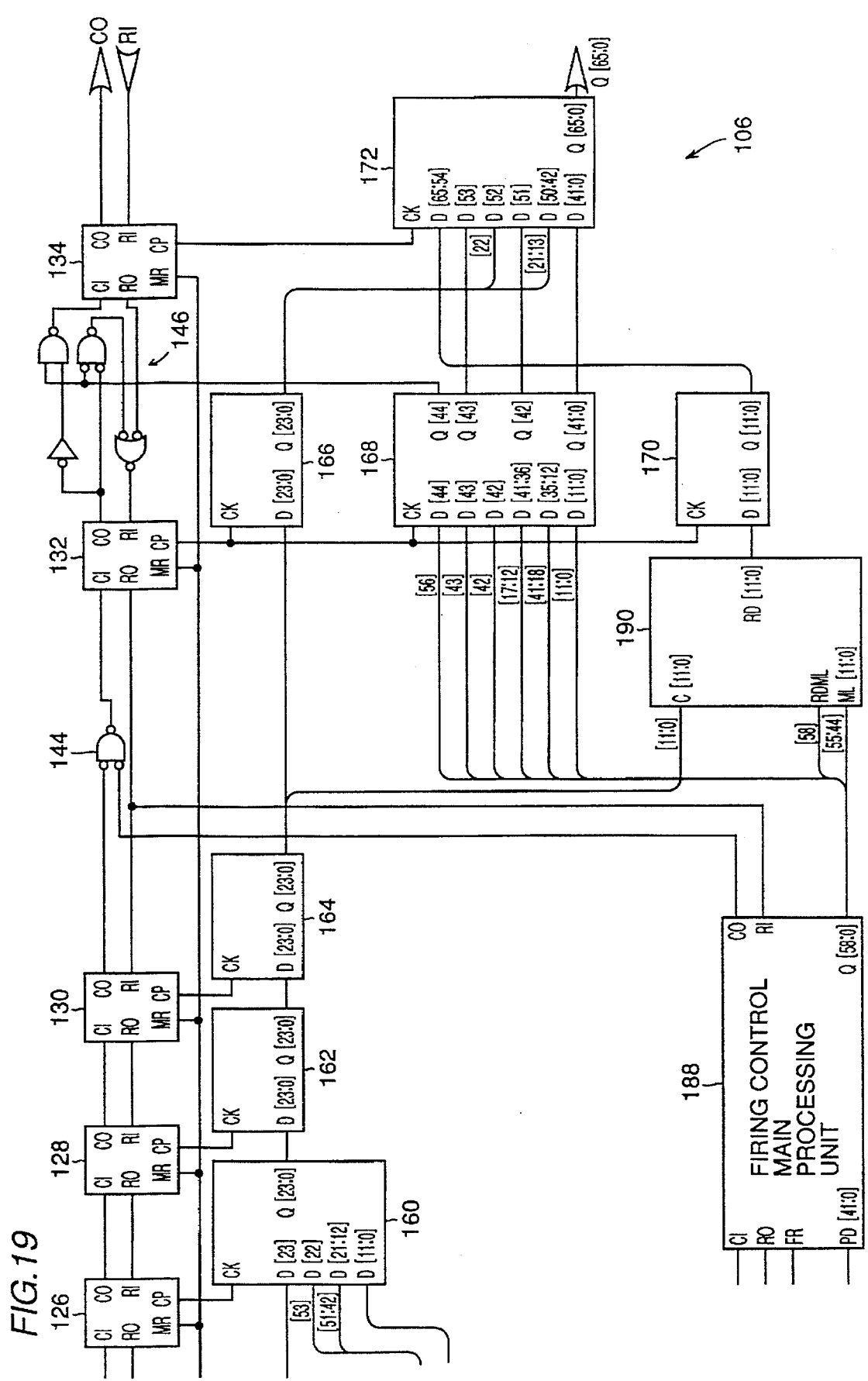

The logic circuit diagrams of CST/FC 106 of FIGS. 18 and 19 are connected as shown in FIG. 17. The structure of an input/output packet with respect to CST/FC 106 is similar to those shown in FIGS. 14 and 15.

Referring to FIGS. 18 and 19, CST/FC 106 includes C-elements 120, 122, 124, 126, 128, 130, 132 and 134, data latches 150, 152, 154, 156, 158, 160, 162, 164, 166, 168, 170 and 172, a load-dump detection unit 180 of a constant data memory, a constant data memory 182, a selector 184, an FC adapted 2-input instruction execution packet detection unit 186, a firing control main processing unit 188, a data pair selection unit 190, logic gate circuits 142 and 144, and transmission control circuits 140 and 146.

Figure 1:
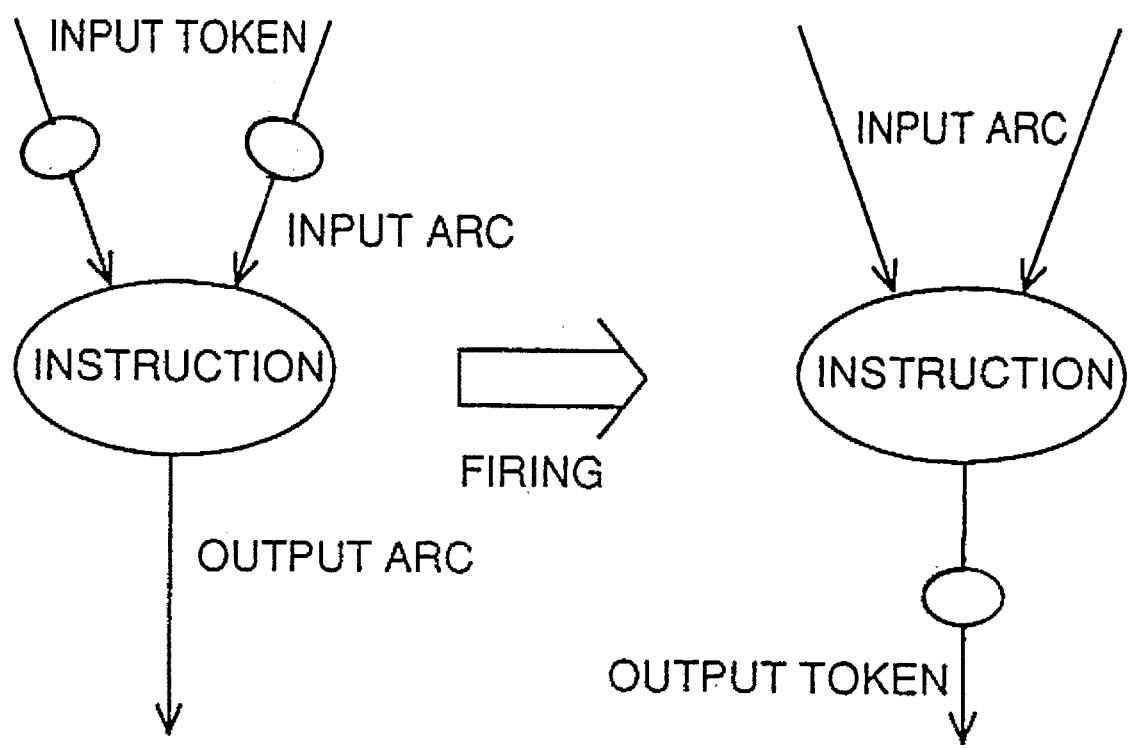
FIG. 1 schematically shows a data driven principle.
Figure 2:
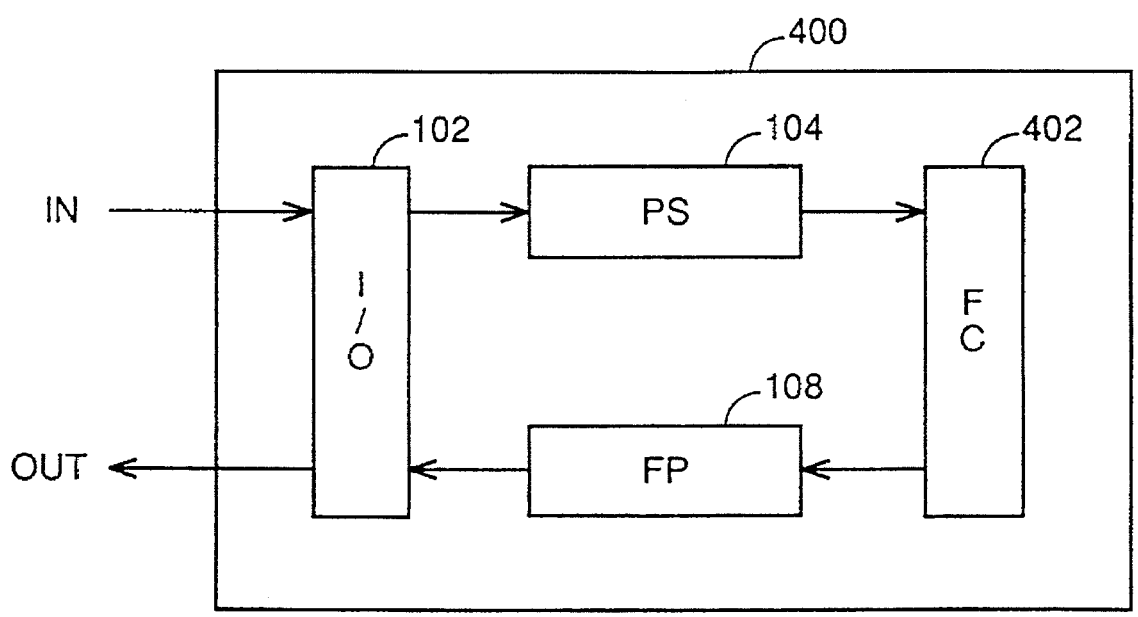
FIG. 2 schematically shows a structure of a conventional data-driven processor.
Figure 3:
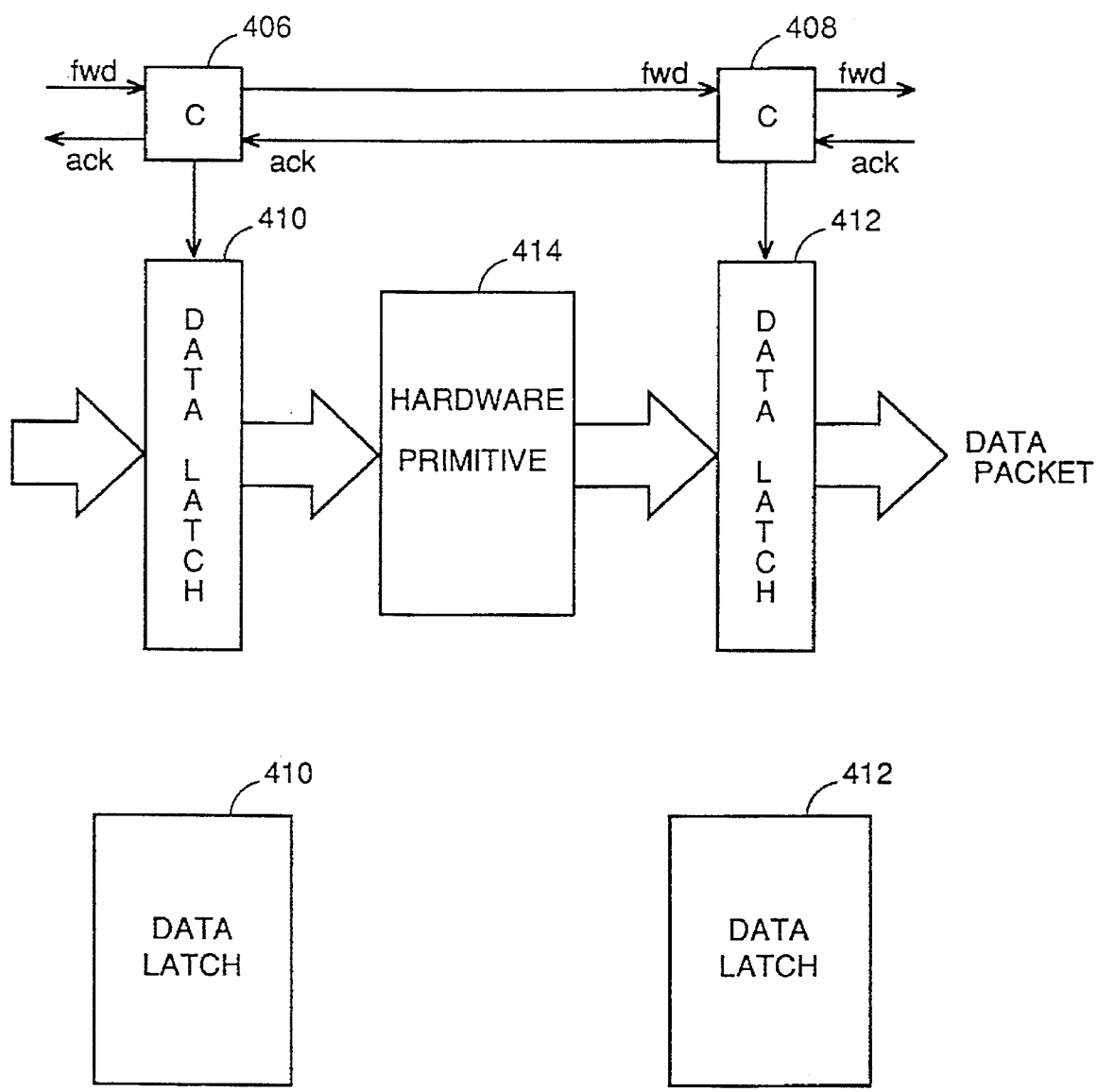
FIG. 3 shows a self timing type data transfer processing mechanism in a circular pipeline.
Figure 4:
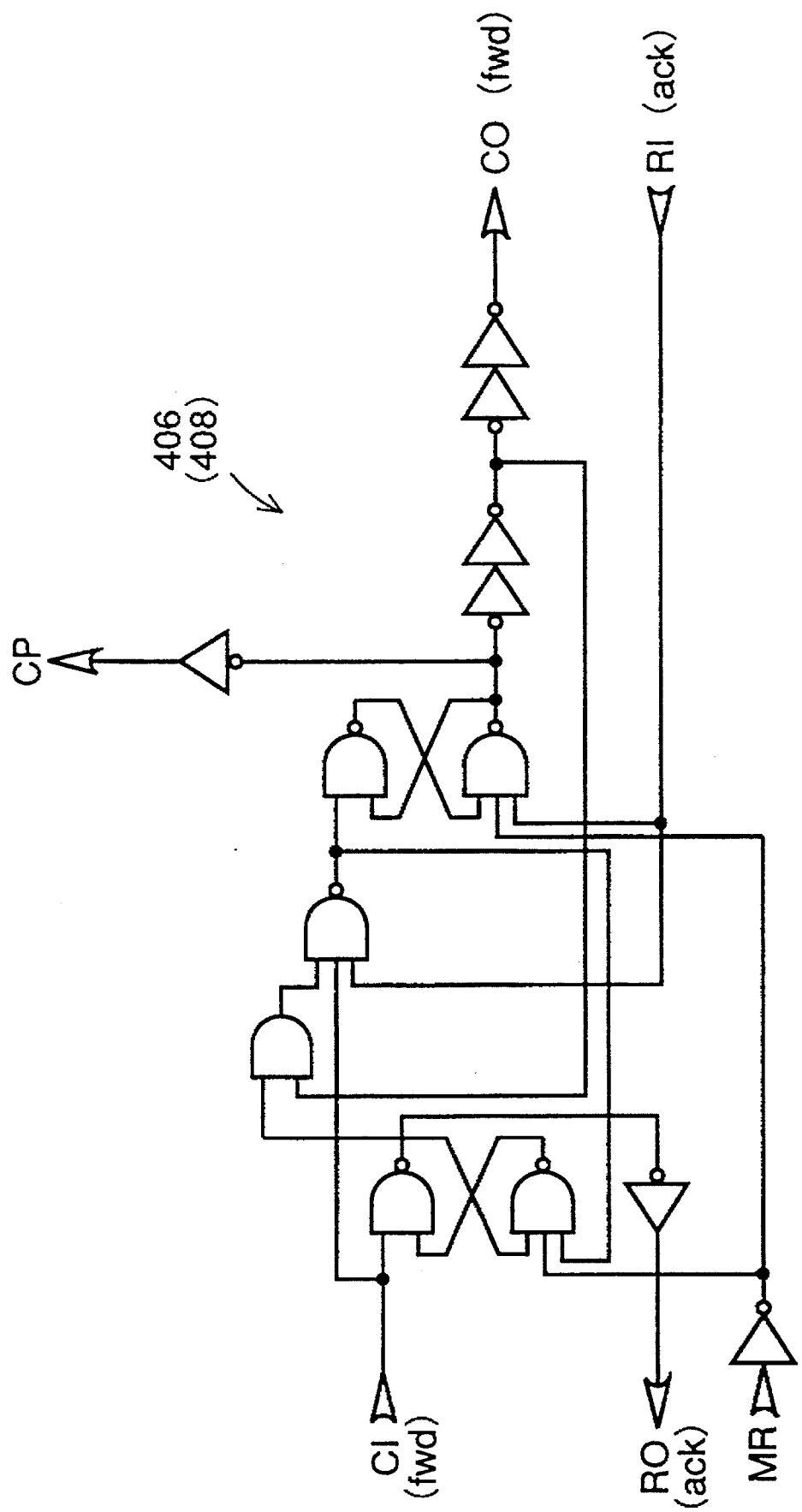
FIG. 4 is a logic circuit diagram of a C-element.
Figure 5:
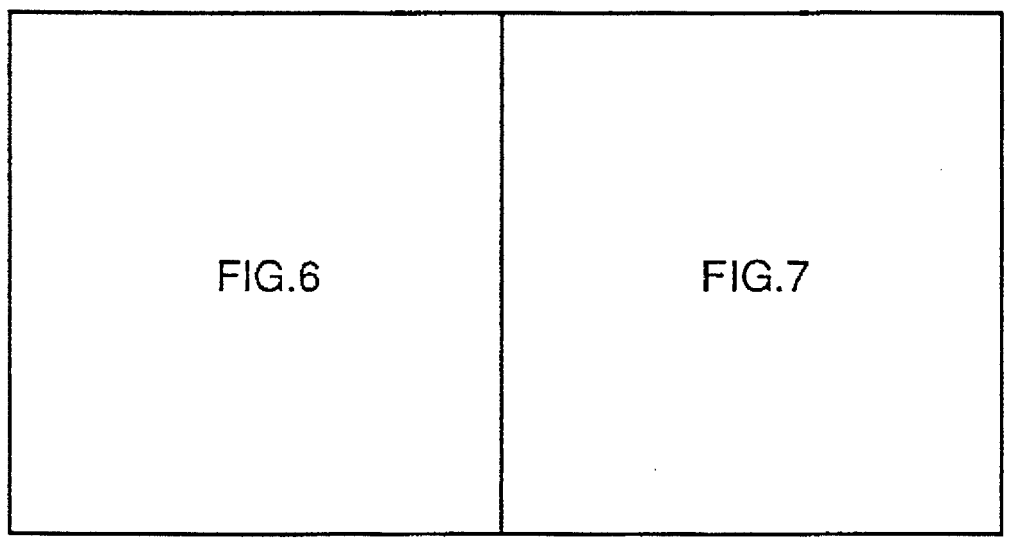
FIG. 5 schematically shows the relationship of FIGS. 6 and 7.
Figure 6:
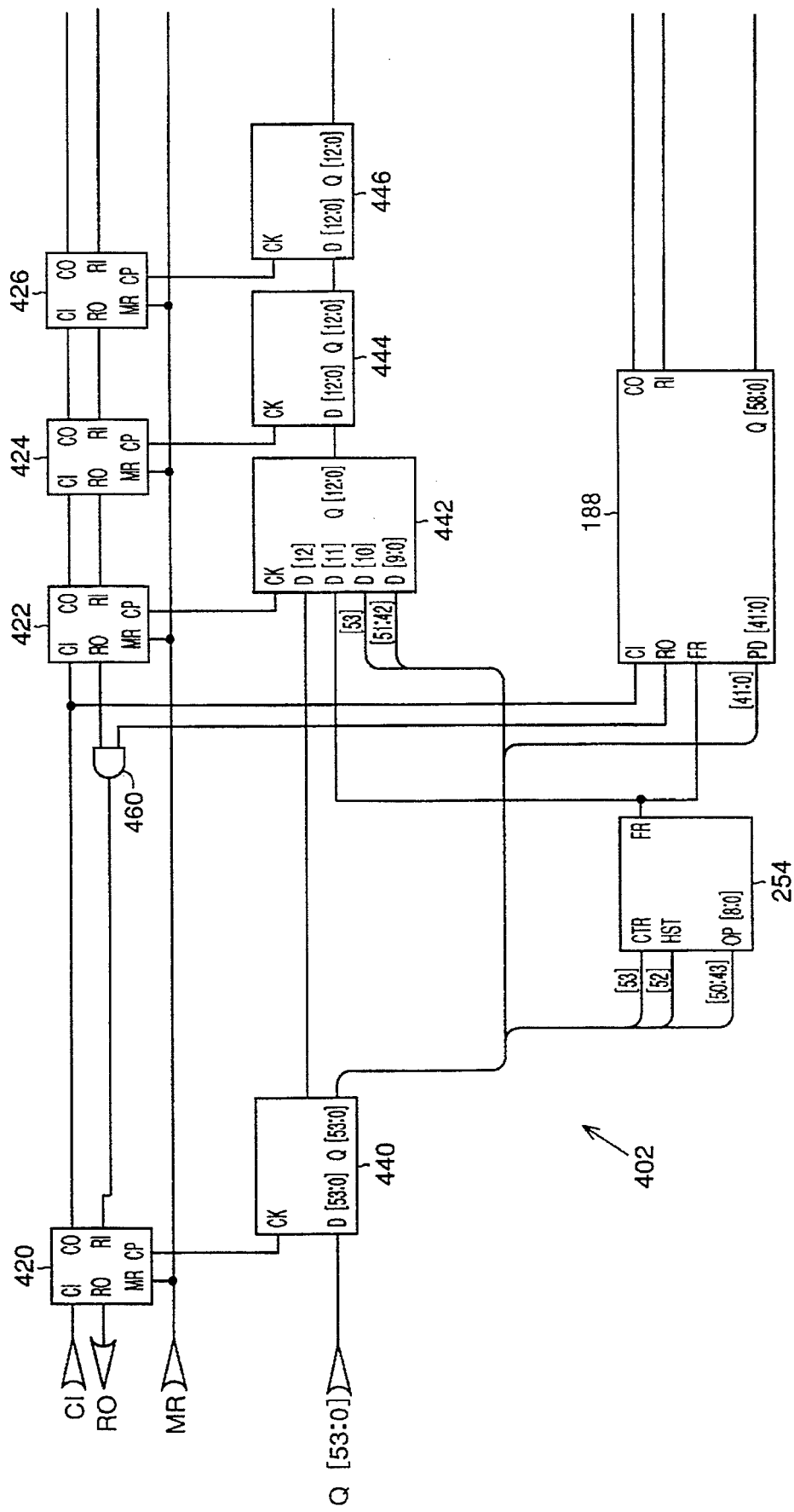
FIG. 6 is logic circuit diagram showing a structure of a portion of a dynamic firing control mechanism of conventional art.
Figure 7:
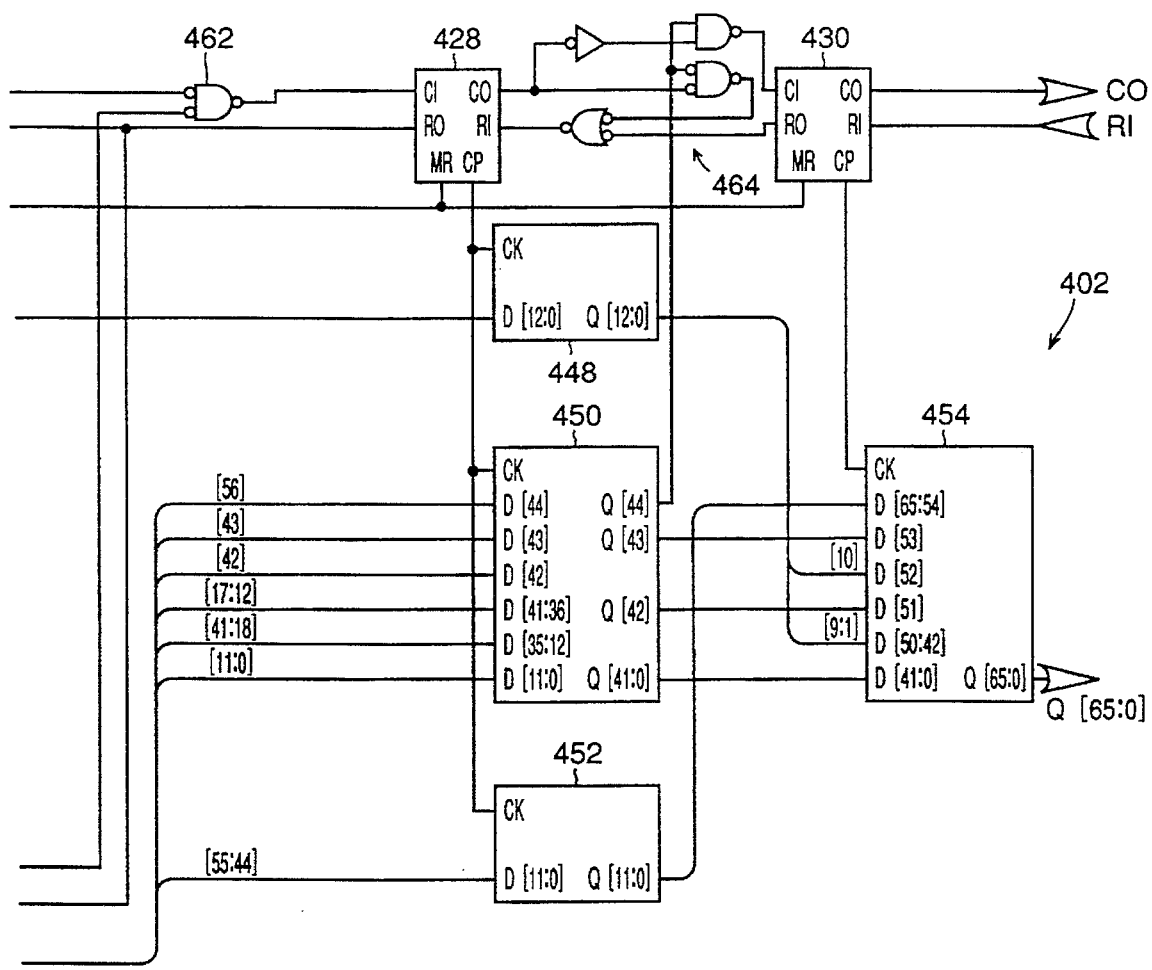
FIG. 7 is a logic circuit diagram showing a structure of another portion of a dynamic firing control mechanism.
Figure 8:
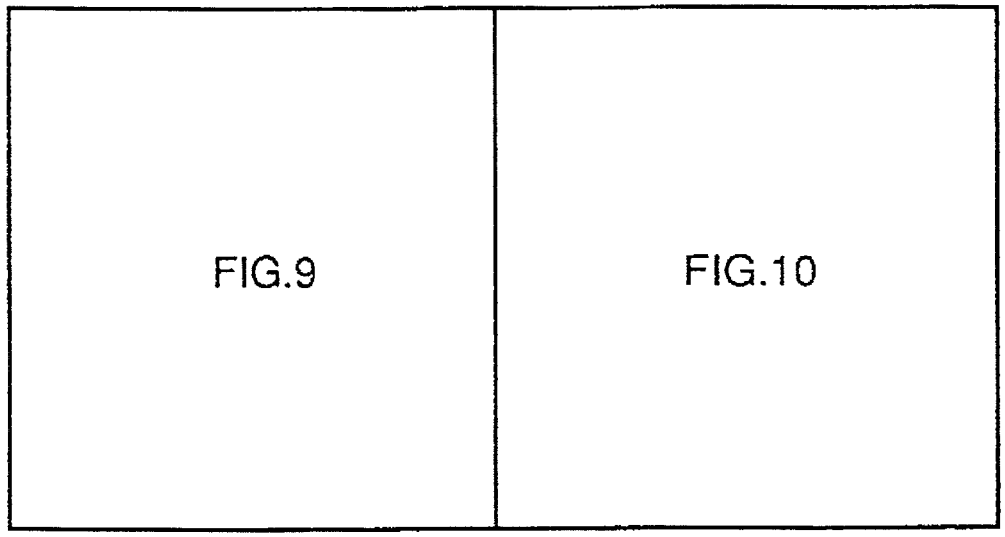
FIG. 8 schematically shows the relationship between FIGS. 9 and 10.

In FIGS. 18 and 19, components relating to those shown in FIGS. 6 and 7 have the same reference characters denoted. The function and label thereof are identical. Therefore, their description will not be repeated.

Figure 20:
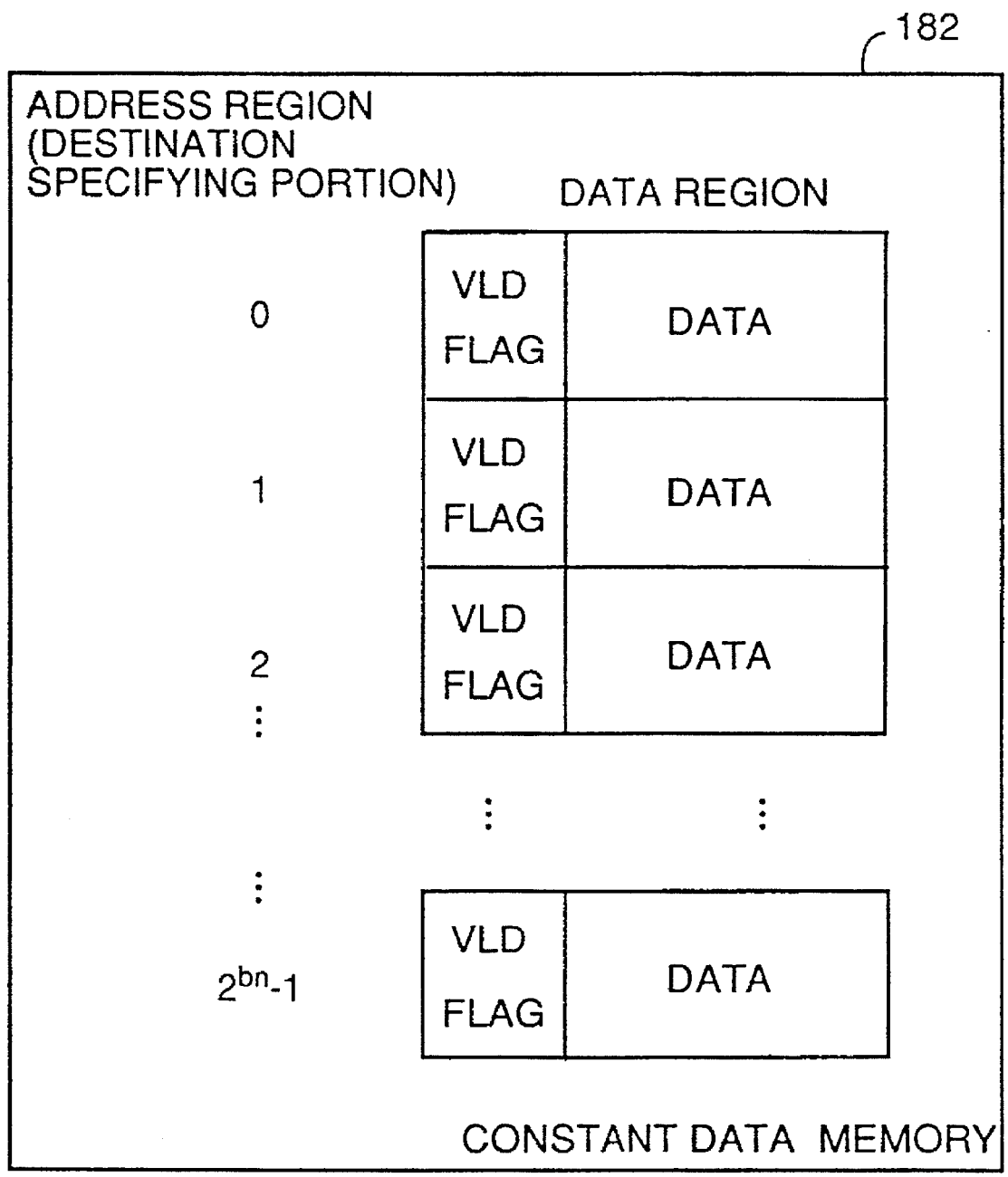
FIG. 20 schematically shows a structure of a constant data memory 182 of the first embodiment.

The stored contents of data of constant data memory 182 is shown in FIG. 20. Referring to FIG. 20, constant data memory 182 has 2bn addresses of 0 to 2bn-1. Constant data and a flag indicating whether that constant data is valid or not (VLD flag) are stored in the data region of each address. Each constant data is stored in advance in an address calculated by a predetermined method according to the node number of which the constant data is used. By providing a data packet including an instruction for load/dumping to the data-driven processor, constant data is written into constant data memory 182 by the function of load-dump detection unit 180 or output from constant data memory 182.

The data-driven processor of the first embodiment carries out a process as set forth in the following. When a packet is provided to CST/FC 106, relevant constant data and a VLD flag are read out from constant data memory 182 according to an address of the destination specifying portion of the input packet. In the present embodiment, constant data memory 182 is addressed according to a node number in the destination specifying portion of the input packet. The VLD flag corresponds to an output terminal VCD of constant data memory 182 shown in FIG. 18. The VLD flag takes the value of 1 and 0 when the value of constant data memory 182 is valid and invalid, respectively.

An access to constant data memory 182 is carried out regardless of whether that input packet is argument data of a 2-input instruction or a 1-input instruction. The constant data output from constant data memory 182 is maintained up to the CST/FC data selection unit (corresponding to pair data selection unit 190 in FIG. 19) of a succeeding stage.

FC-adapted 2-input instruction execution packet detection unit 186 detects whether an input packet is a 2-input instruction execution packet or not. FC-adapted 2-input instruction execution packet detection unit 186 generates a flag FR indicating whether an input packet is a 2-input instruction execution packet or not, and provides this FR to firing control main processing unit 188 together with the required data in the input packet. In the present embodiment, the data value generated in firing control main processing unit 188 (corresponding to input ML of pair data selection unit 190 of FIG. 19) and the data value output from constant memory 182 (corresponding to input C of pair data selection unit 190 of FIG. 19) are selected when flag FR is 1 and 0, respectively. Although the process carried out by firing control main processing unit 188 is typical, the details will be described hereinafter.

Figure 9:
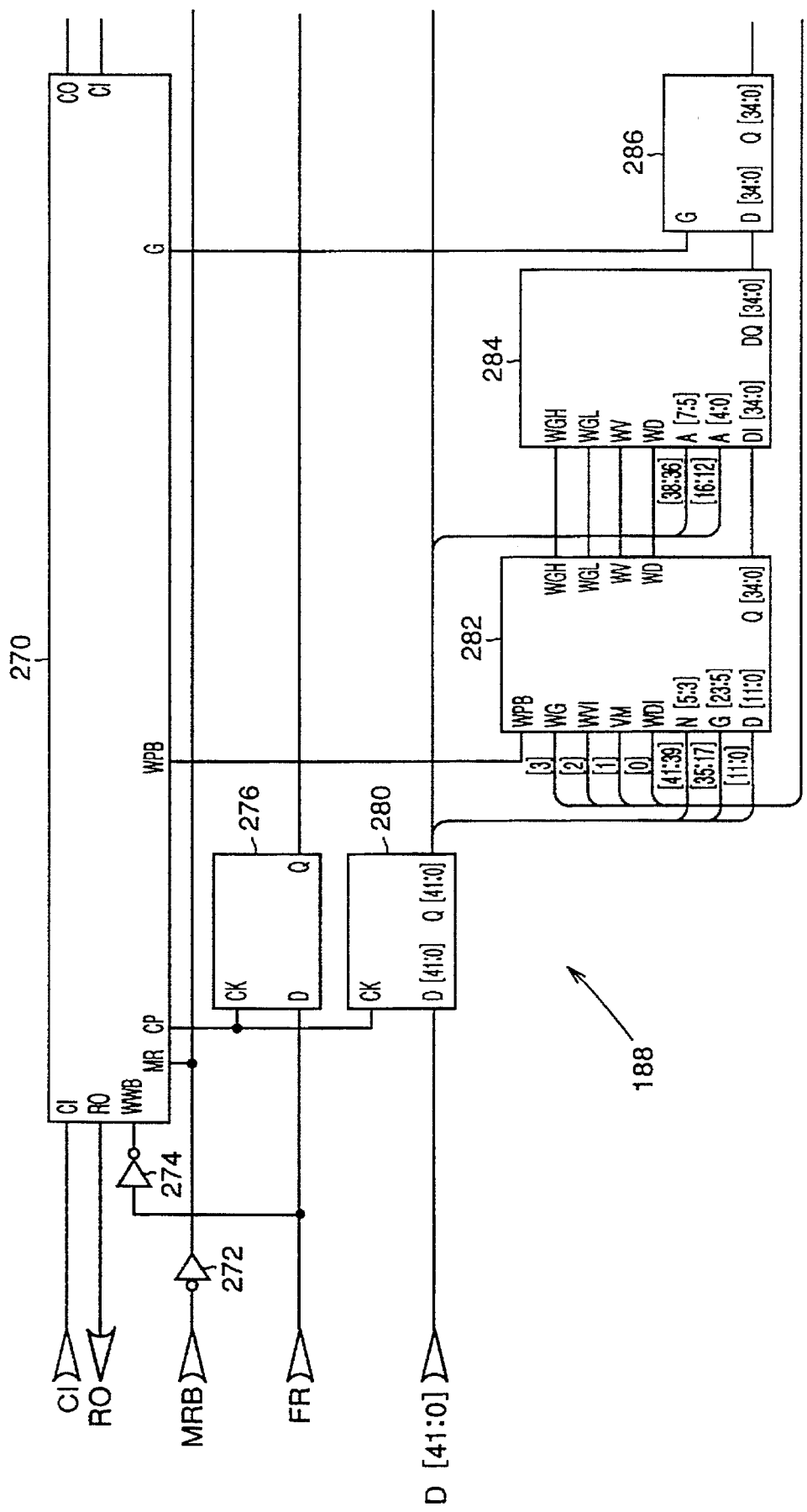
FIG. 9 is a logic circuit diagram showing a structure of a portion of a firing control main processing unit of conventional art.
Figure 10:
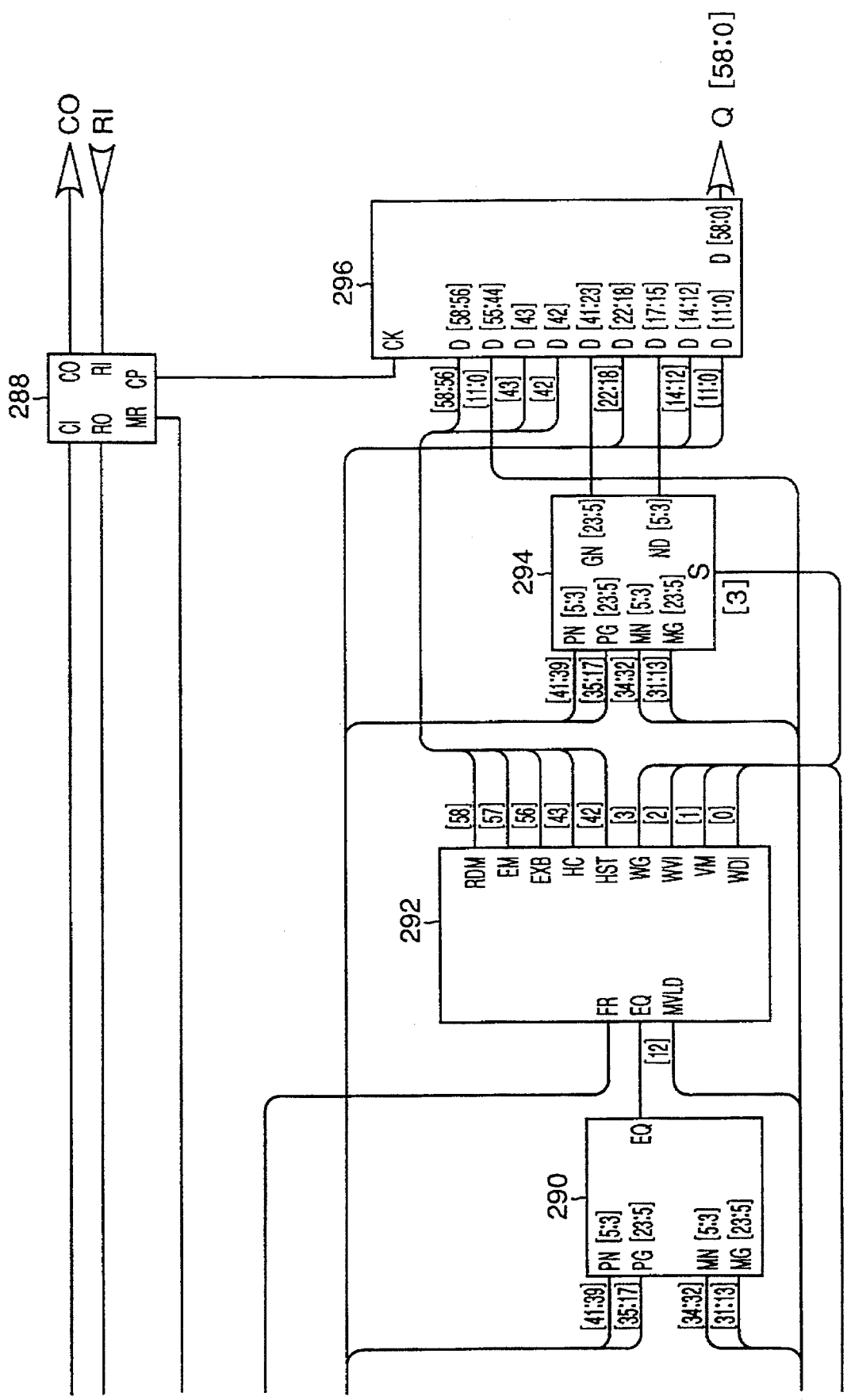
FIG. 10 is a logic circuit diagram showing a structure of another portion of a firing control main processing unit of the conventional art.
Figure 11:
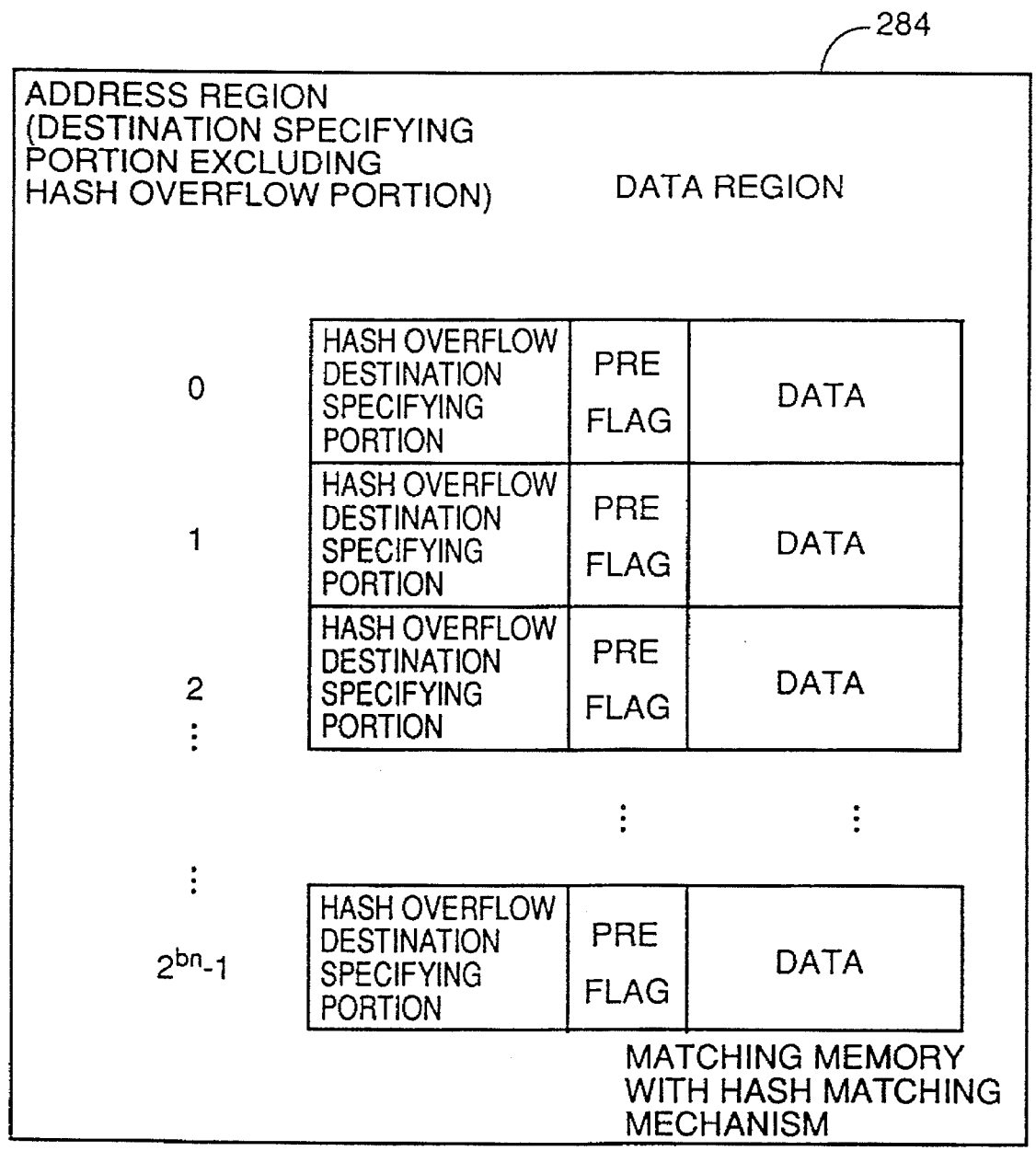
FIG. 11 schematically shows a structure of a matching memory 284 with a hash matching mechanism.
Figure 12:
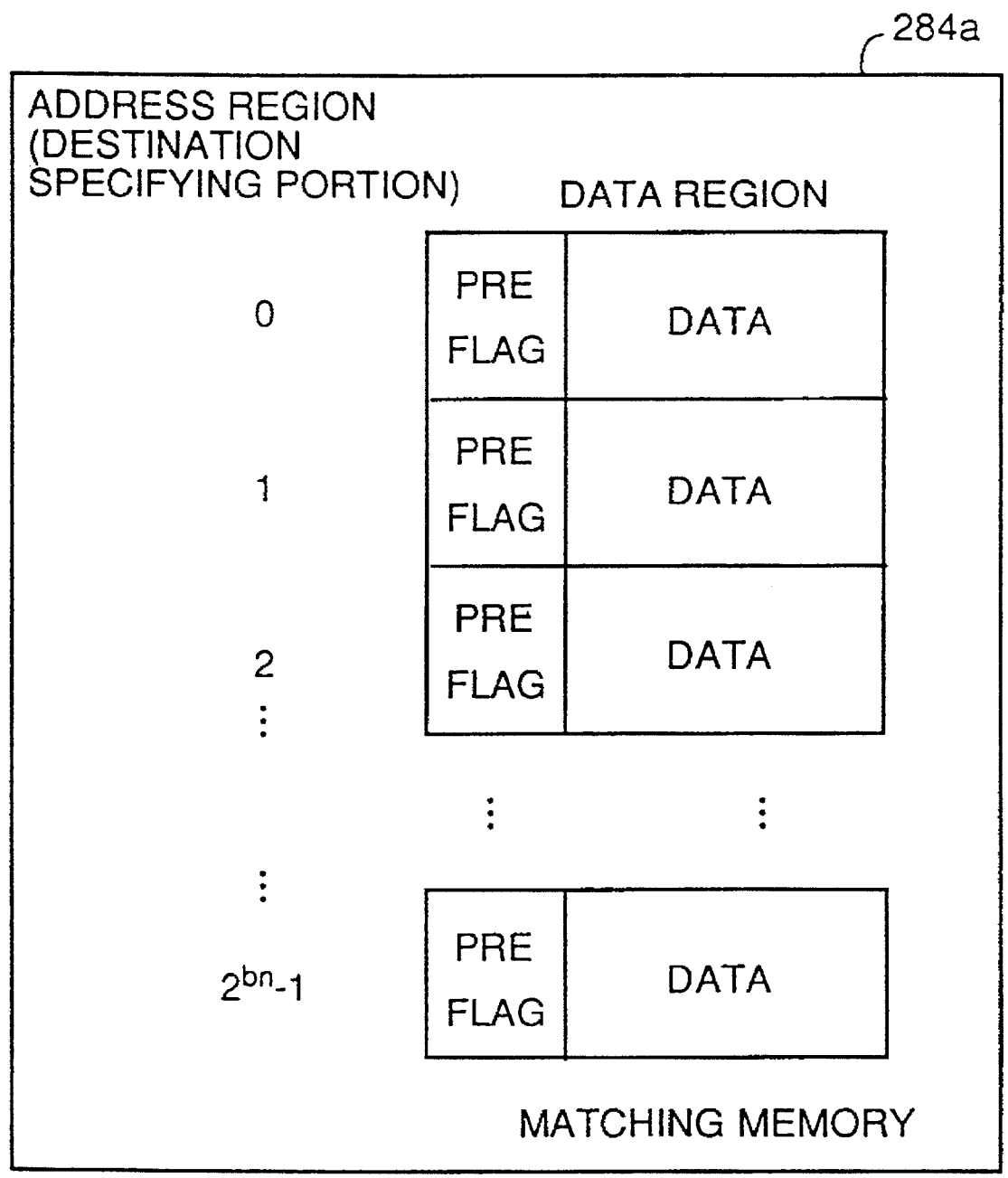
Figure 13:
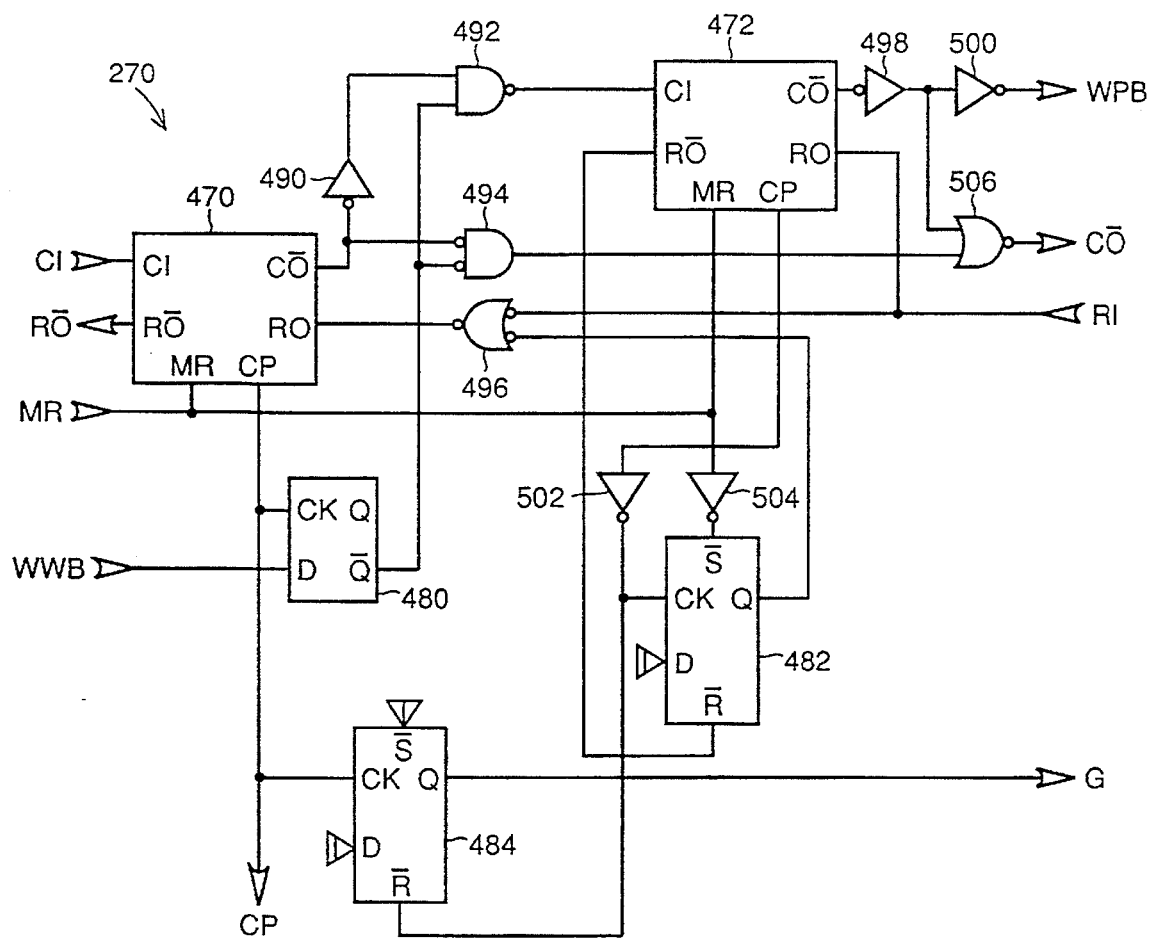
FIG. 13 is a logic circuit diagram of a C-element for firing control main processing unit.

Referring to FIGS. 9 and 10, firing control main processing unit 188 receives flag FR and the required data in the applied packet. When the input packet is a 1-input instruction packet, i.e. when flag FR is 0, the input packet is subject to a through process. More specifically, when the signal value applied to terminal WWB of C-element for firing control main processing unit 270 is 1, a short interstage process time mode is selected and a through process is carried out.

When an input packet is a 2-input instruction execution packet, the following process is carried out. The data output from matching memory 284 is read out (FIG. 9) using a pair of bits in the destination specifying portion of the input packet as the address. The destination specifying portion read out from matching memory 284 and the hash overflow destination specifying portion of the input packet are compared, whereby detection is made whether hash collision has occurred or not by the hash collision detection unit 290 shown in FIG. 10. The next firing detail detection unit 292 carries out a firing control process when the input packet is a 2-input instruction execution packet, hash collision has not occurred, and the data read out from the memory is valid (PRE=1). Then, the data in the input packet and the data read out from the memory are collected by data latches 294 and 296, whereby a packet is formed and output. At the same time, the data on the memory of the relevant address is invalidated (PRE=0). More specifically, the value of the PRE flag of the relevant address in the memory is set to a value indicating invalid.

When the input packet is a 2-input instruction execution packet, data read out from matching memory 284 is valid (PRE=1), and generation of hash collision is detected by hash collision detection unit 290, a packet is output having the value of the hash collision flag set to a valid value. This packet is circulated through the circular pipeline again, and a firing detection process is carried out again when it arrives at constant data memory/dynamic firing control mechanism 106.

When the input packet is a 2-input instruction execution packet, and the data read out from matching memory 184 is invalid (PRE=0), the data value in the input packet is written into the relevant address. Here, a value indicating a valid value is written into the PRE flag of that address.

Information output from firing control main processing unit 188 (refer to FIG. 19) is assembled as a packet in pair data selection unit 190 by collecting/selecting information required for a packet. The assembled packet is output from CST/FC 106. Here, pair data selection unit 190 selects the output of constant data memory 182 and firing control main processing unit 188 when the VLD flag output from constant data memory is 1 and 0, respectively. Since firing control main processing unit 188 operates only when the VLD flag read out from constant data memory 182 is 0, the number of packets to be processed by firing control main processing unit 188 is reduced. This reduces the possibility of the processing operation of this portion becoming the bottleneck of the entire system.

When the instruction code of an input data packet is a load or dump instruction, load-dump detection unit 180 of constant data memory 182 controls constant data memory 182 via latch 152, whereby the data of the applied data packet is written into a specified address, or the contents stored in constant data memory 182 is output therefrom. The provision of such a load-dump detection unit 180 allows writing or reading to and from constant data memory 182. Therefore, the content of constant data memory 182 can be modified easily, so that this data-driven processor can be used in a wider range of applications. It is to be noted that load-dump detectionunit 180 is not required if simple writing or reading to and from constant data memory 182 is not to be limited.

Second Embodiment

Figure 21:
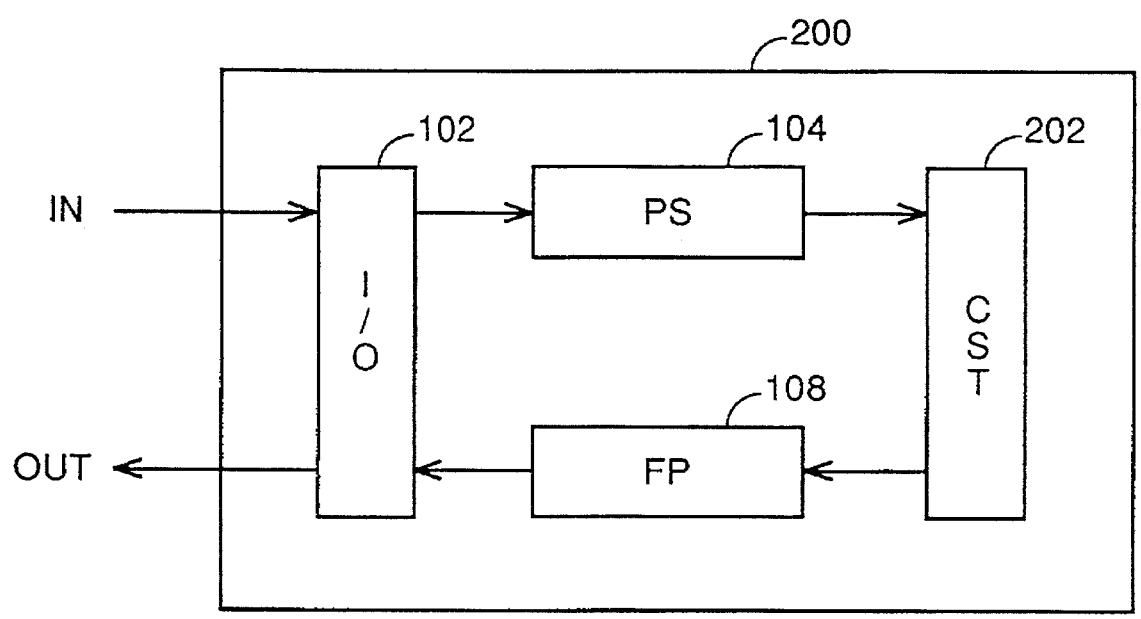
FIG. 21 schematically shows a structure of a data-driven processor according to a second embodiment of the present invention.

Referring to FIG. 21, a data-driven processor 200 of a second embodiment differs from the data-driven processor of FIG. 16 in that a constant data memory mechanism (CST) 202 is included instead of CST/FC 106. Constant data memory mechanism (CST) 202 does not carry out a dynamic data pair generation process, and only process of constants.

Figure 22:
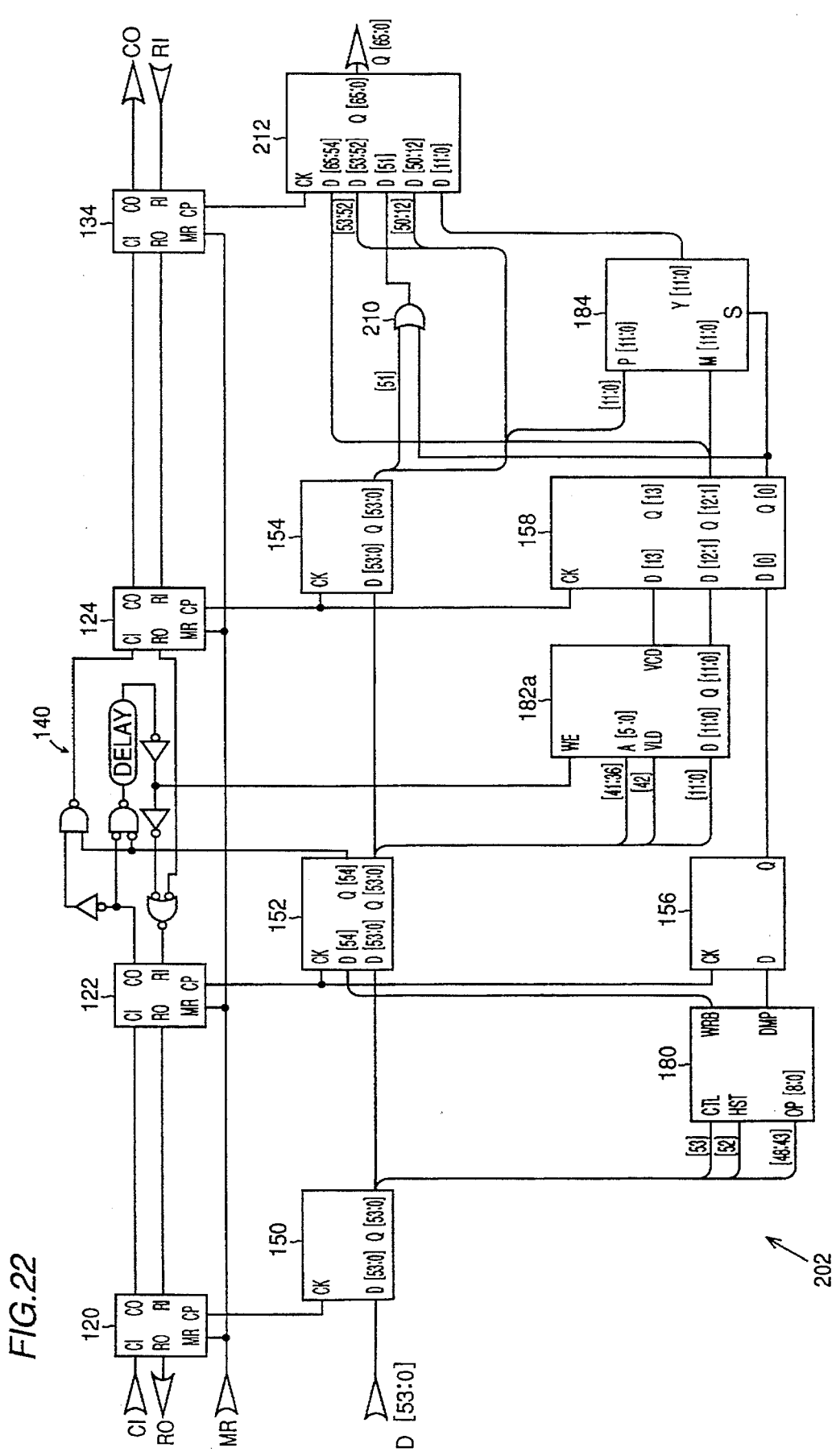
FIG. 22 is a logic circuit diagram of a constant data memory mechanism 202 of the second embodiment.

FIG. 22 shows a logic circuit diagram of CST 202 of FIG. 21. Referring to FIG. 22, CST 202 includes C-elements 120, 122, 124 and 134, data latches 150, 152, 154, 156 and 158, a load-dump detection unit 180 of a constant data memory, a constant data memory 182a, selector 184, a data latch 212, a logic gate circuit 210, and a transmission control circuit 140. In FIG. 22, components corresponding to those shown in FIGS. 18 and 19 have the same reference characters denoted. Their function and labels are identical. Therefore, the description thereof are not repeated.

Figure 23:
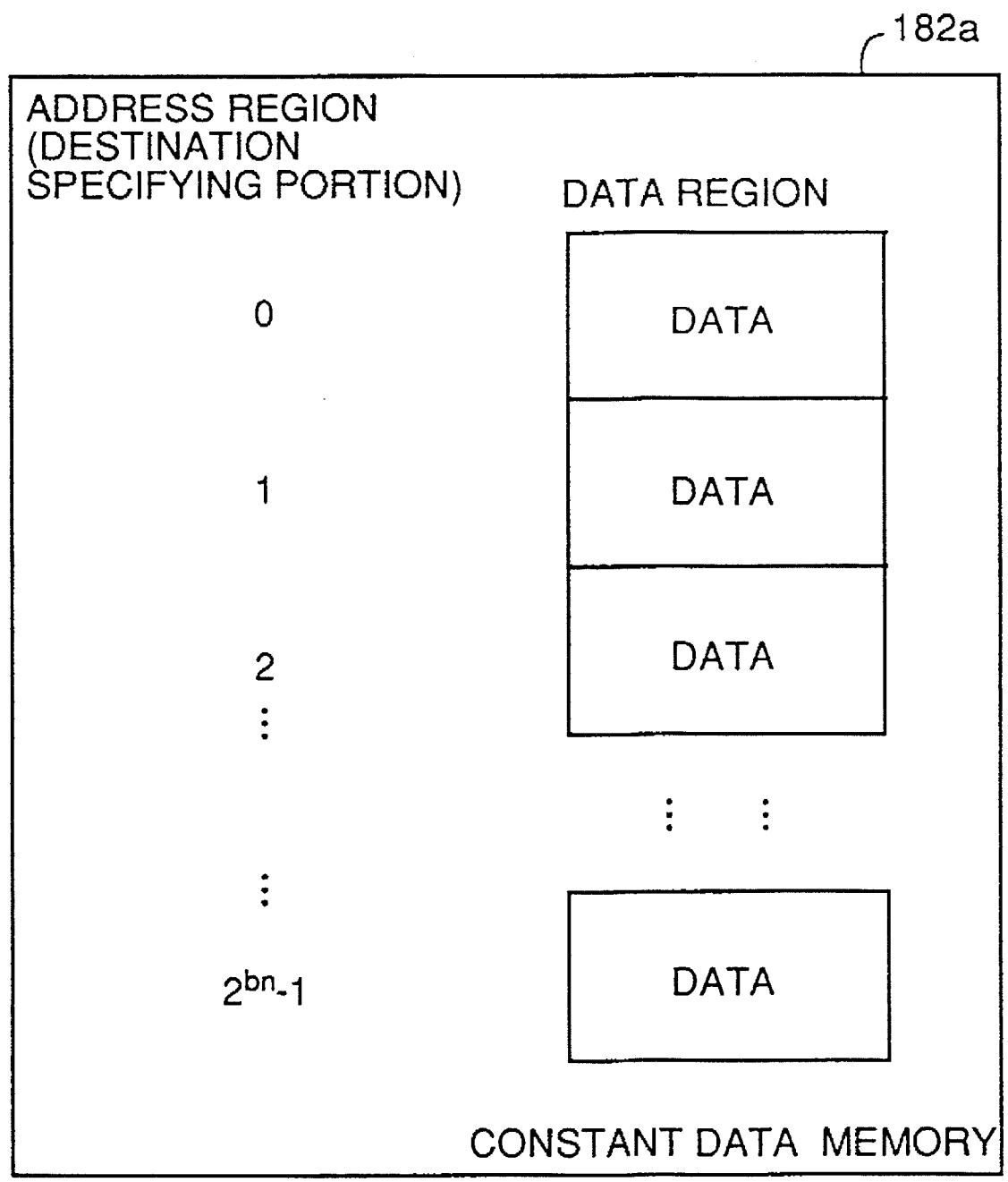
FIG. 23 schematically shows a structure of constant data memory 182a of the second embodiment.

The contents of constant data memory 182a of FIG. 22 is shown in FIG. 23. Constant data memory 182a of FIG. 23 differs from that of FIG. 20 in that only data is stored in each address, and a VLD (valid) flag is not stored. This is because only selection of the output of constant data memory 182a is required since only a constant process is carried out and no dynamic data pair generation process is carried out by the constant data memory.

The data-driven processor of the second embodiment carries out the process as set forth in the following. The process carried out particularly by CST 202 will only be described. Referring to FIG. 22, constant data is read out from constant data memory 182a according to an addressing operation using a portion of the destination specifying portion of an input packet. In the present embodiment, the node number portion of an input packet is used for addressing. The readout constant data have the required information collected/selected together with the input packet by data latches 158 and 212 and selector 184, whereby a packet is formed. This packet is output from CST 202. The succeeding operation of this data-driven processor is similar to that of the first embodiment.

In the second embodiment, a dynamic data pair generation process is not carried out. Only a matching process with a constant by a constant data process is carried out. Therefore, although the process that can be carried out is limited in comparison with that including a dynamic data pair generation process, the amount of hardware is reduced significantly. There is also an advantage that the process can be carried out at high speed.

Similar to the first embodiment, constant data memory load-dump detection unit 180 may not be provided.

Third Embodiment

Figure 24:
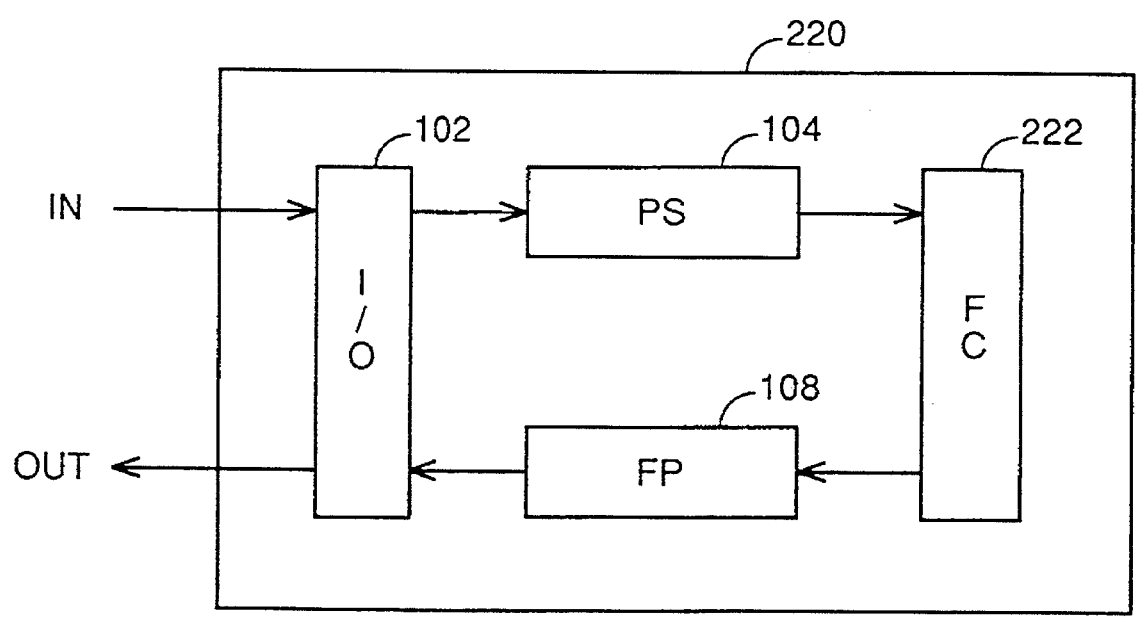
FIG. 24 schematically shows a structure of a data-driven processor according to a third embodiment of the present invention.

A data-driven processor 220 according to a third embodiment of the present invention shown in FIG. 24 differs from the data-driven processor of FIG. 16 in that a dynamic firing control mechanism FC 222 including an interleave process is provided instead of CST/FC 106. In short, a plurality of dynamic firing control mechanisms are provided in FC 222 which are operated in an interleaving manner. This provides the advantage that the plurality of dynamic firing control mechanisms can be used in an interleaving manner to reduce the load of each dynamic firing control mechanism by taking into consideration the order of the data packet applied to FC 222.

Figure 25:
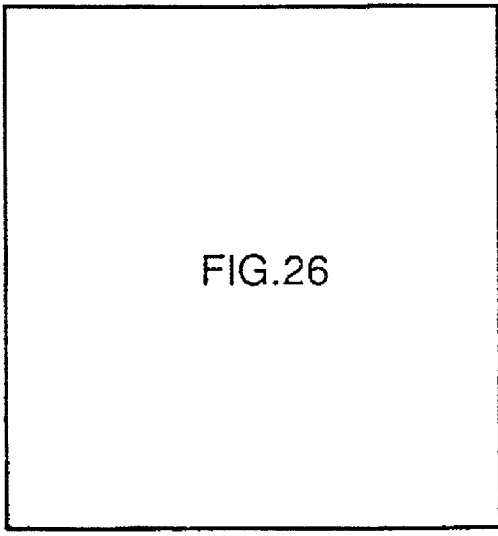
FIG. 25 schematically shows the relationship between FIGS. 26 and 27.
Figure 25:
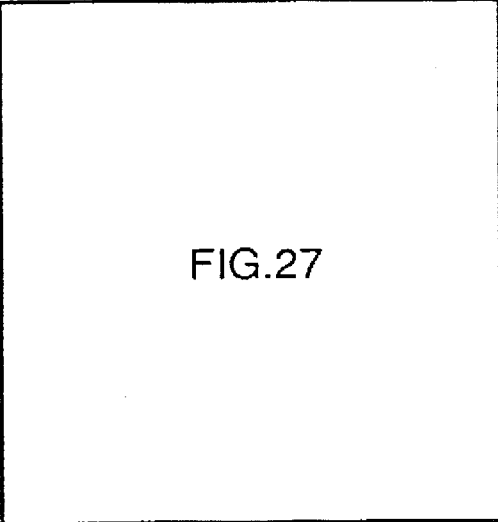
Figure 26:
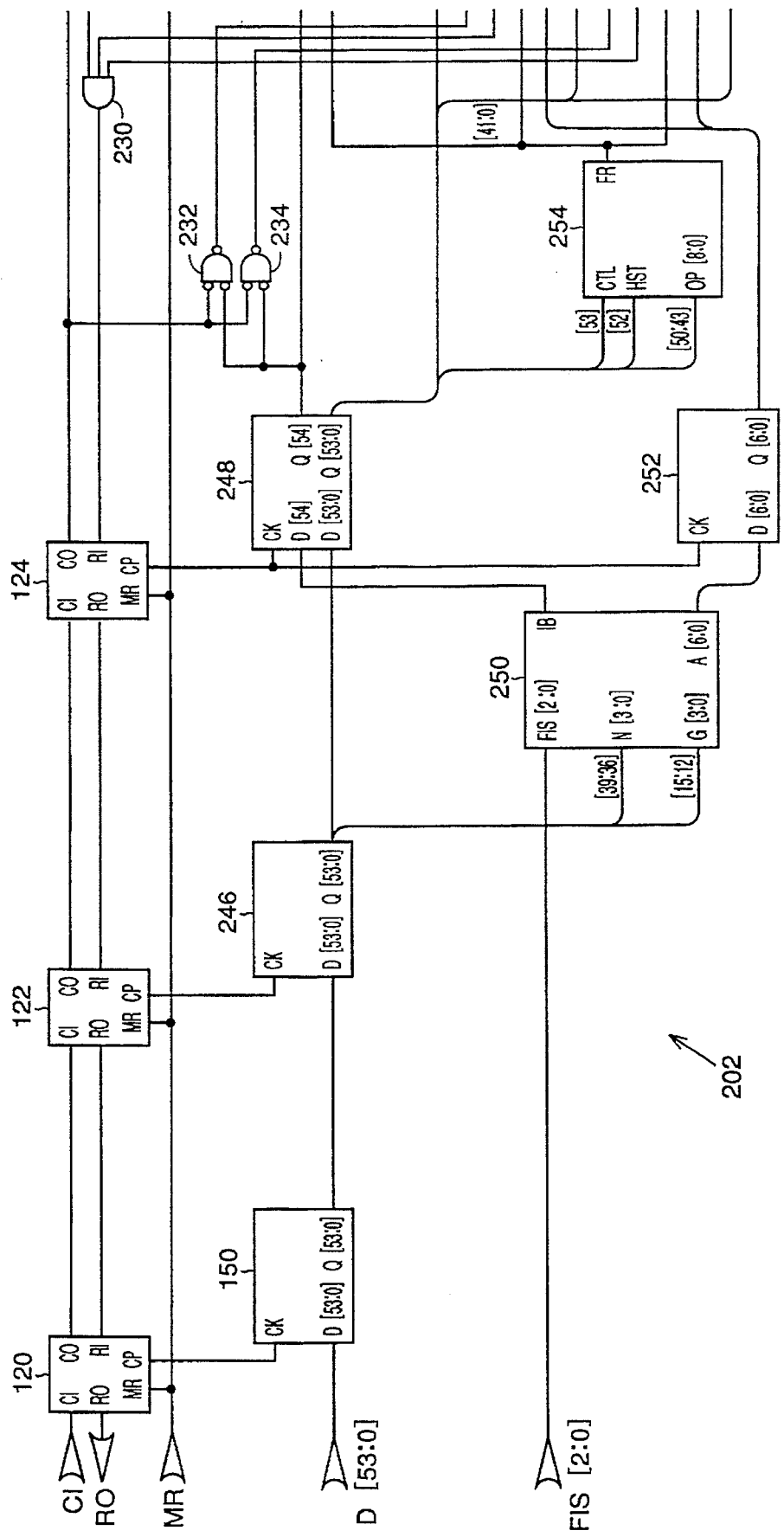
FIGS. 26 and 27 shows one portion and the other portion, respectively, of a dynamic firing control mechanism 222 with interleave processing of the data-driven processor of the third embodiment.
Figure 27:
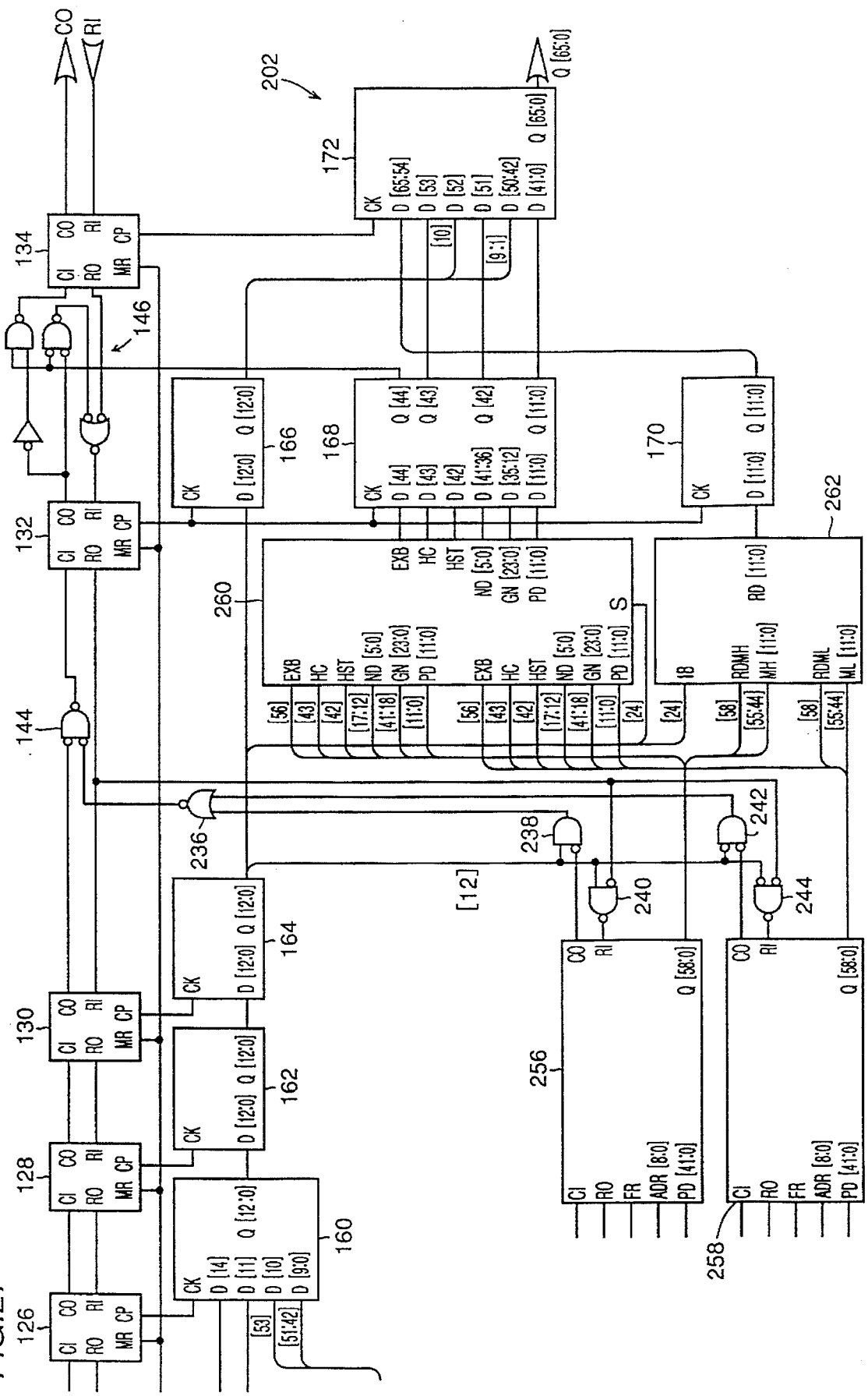

A logic circuit diagram of FC 222 is shown in FIGS. 26 and 27, which are connected as shown in FIG. 25.

Referring to FIGS. 26 and 27, FC 222 includes C-elements 120, 122, 124, 126, 128, 130, 132 and 134, data latches 150, 160, 162, 164, 166, 168, 170, 172, 246, 248 and 252, an interleave flag and FC address detection unit 250 in interleaving, an FC-adapted 2-input instruction execution packet detection unit 254, two firing control main processing units 256 and 258, an output data selection unit 260 of a firing control main processing unit, a pair data selection unit 262, logic gate circuits 230, 232, 234, 236, 238, 240, 242, 244 and 144, and a transmission control circuit 146. In FIGS. 26 and 27, components corresponding to those shown in FIGS. 18, 19 and 22 have the same reference characters denoted. The function and label thereof are similar. Therefore, their description will not be repeated.

Figure 28:
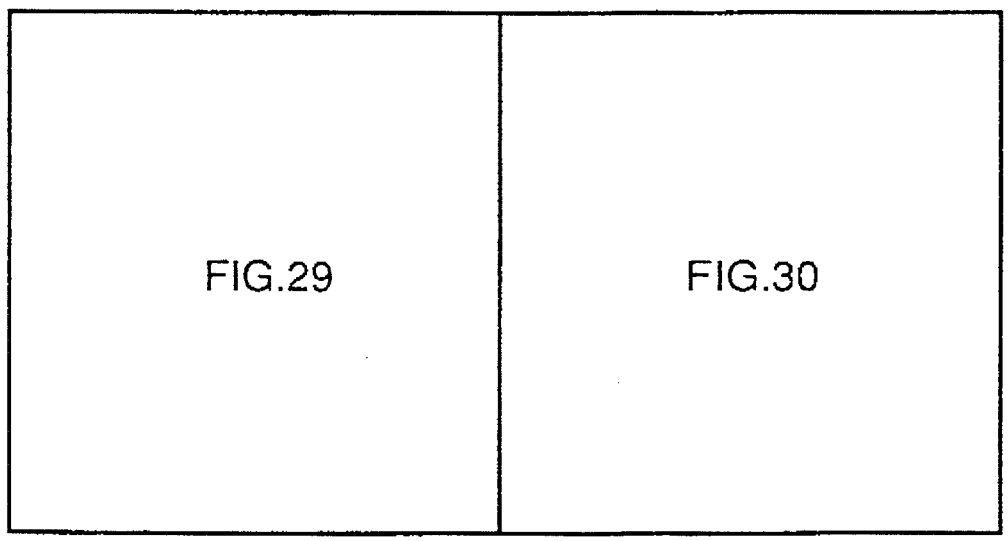
FIG. 28 shows the relationship between FIGS. 29 and 30.
Figure 29:
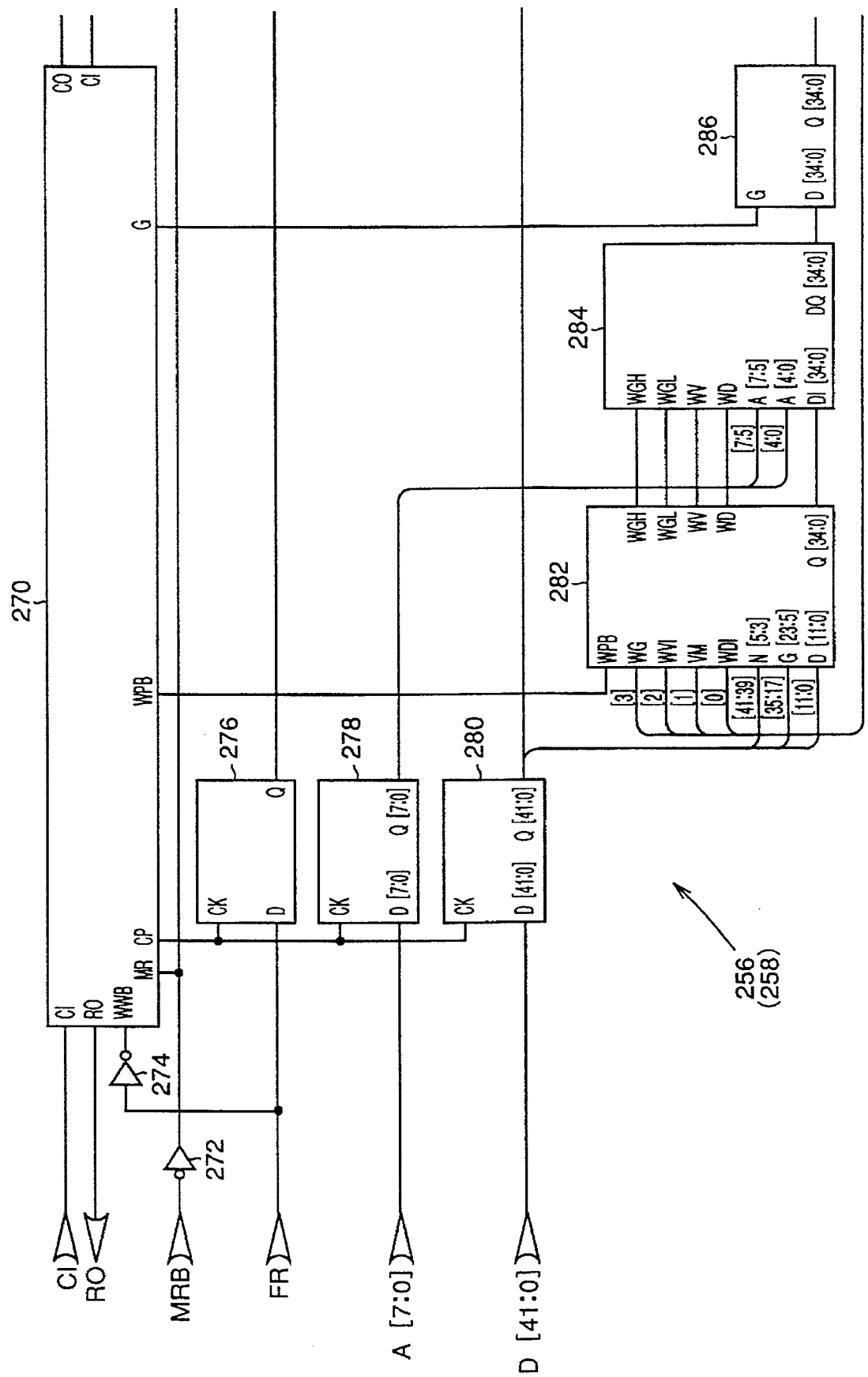
FIGS. 29 and 30 show one portion and the other portion, respectively, of a structure of a firing control main processing unit of the data-driven processor of the third embodiment.
Figure 30:
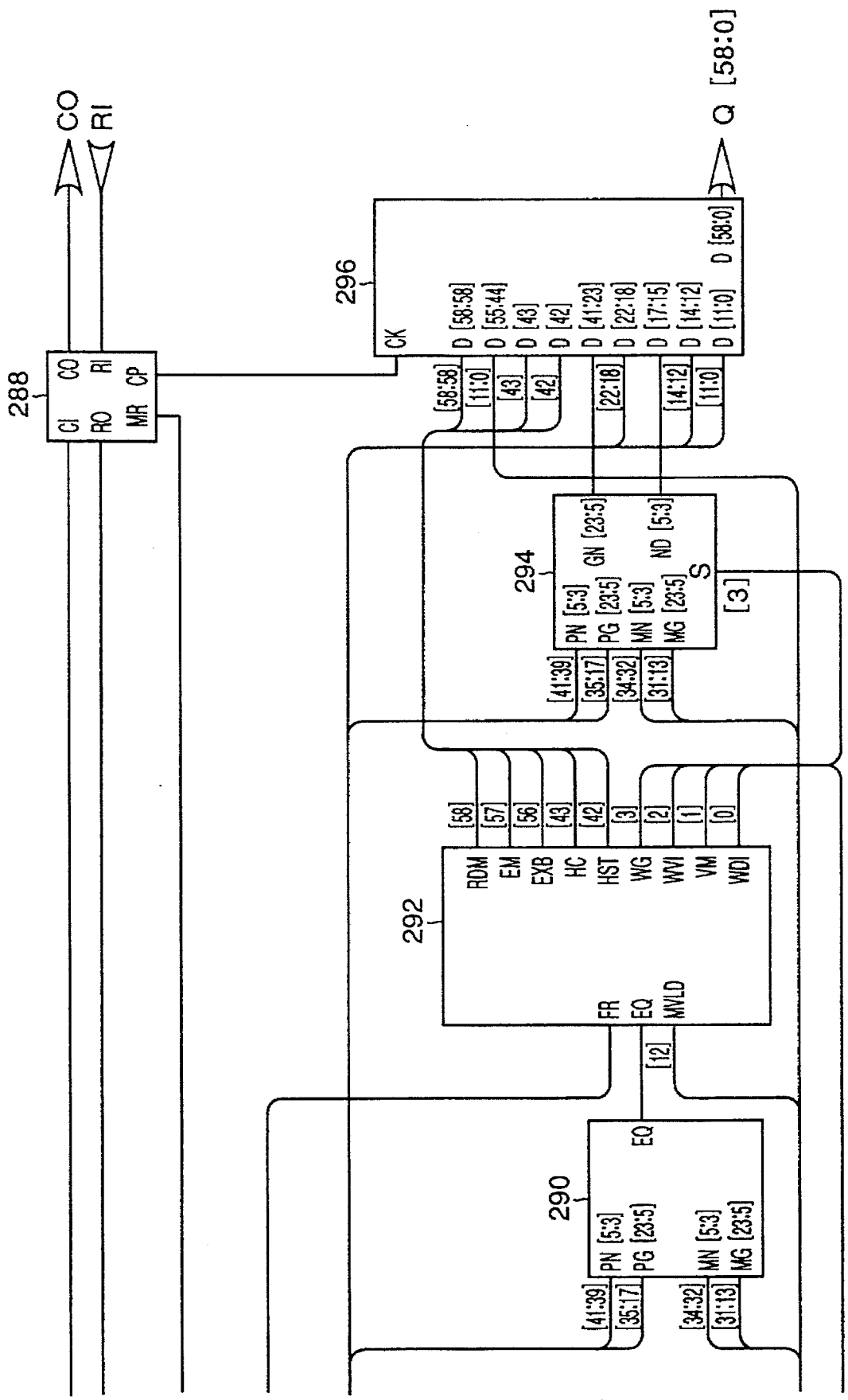

The structure of firing control main processing unit 256 or 258 of FIG. 27 is shown in FIGS. 29 and 30, which are to be joined as shown in FIG. 28.

Referring to FIGS. 29 and 30, firing control main processing unit 256 or 258 includes a C-element for firing control main processing unit 270, a C-element 288, inverters 272 and 274, data latches 276, 278, 280, 286 and 296, an access adjusting unit 286 for a matching memory, a matching memory 284, a hash collision detection unit 290, a firing detail detection unit 292, and a destination information selection unit 294. In FIGS. 29 and 30, components corresponding to those of FIGS. 9 and 10 have the same reference characters denoted. The labels thereof are also similar. Therefore, their description will not be repeated.

The data-driven processor of the third embodiment operates as set forth in the following. Only the operation of FC 222 will be particularly described. An externally applied FIS parameter is provided to a terminal FIS shown in FIG. 26. This FIS parameter is stored in, for example, a register. An FIS parameter is the information for specifying which information of the destination specifying portion is used to select a firing control main processing unit in interleaving and using firing control main processing units 256 and 258. In the present embodiment, the FIS parameter is 3 bits. Therefore, a combination of 8 types can be specified.

Interleave flag and FC address detection unit 250 in interleaving carries out a specified address calculation according to the FIS parameter, and provides an address to firing control main processing units 256 and 258 via data latch 252. This address is used in accessing the matching memory. In the present embodiment, firing control main processing units 256 and 258 are selected to carry out a process when an IB flag indicating which of a firing control main processing unit is to be selected is 1 and 0, respectively.

FC-adapted 2-input instruction execution packet detection unit 254 detects whether the input packet is a 2-input instruction execution packet or not to generate a flag FR indicating the detection result. Flag FR is provided to firing control main processing units 256 and 258 together with an input packet data.

Referring to FIGS. 29 and 30, the process carried out by firing control main processing unit 256 or 258 is basically similar to that described with reference to FIGS. 9 and 10. However, it is to be noted that an address is used in accessing in matching memory 284 generated by the above-described interleave flag and FC address detection unit 250 in interleaving. The information output from firing control main processing unit 256 or 258 is subjected to collection/ selection of information required for a packet that is carried out in output data selection unit 260 of a firing control main processing unit and pair data selection unit 262 to be assembled as a data packet. This data packet is output from FC 222.

Since a plurality of firing control main processing units are provided which is selectively used to carry out a process depending upon a portion of the destination information in an input packet as in the present embodiment, firing control main processing units 256 and 258 can be used in an interleaving manner by providing a data packet in an appropriate order to the data-driven processor while referring to, for example, the destination information. The load of each firing control main processing unit is reduced, and a greater processing capability is available in comparison with that of a conventional dynamic firing control mechanism. Therefore, the possibility of this firing control mechanism becoming the bottleneck in the process of the entire data driven processor is reduced.

In the present embodiment, the method of address specification is modified using an FIS parameter. The present invention is not limited to the present embodiment, and the method of generating an address may not depend upon the FIS parameter. Furthermore, the number of bits of the FIS parameter is not limited to 3 bits as in the present embodiment. Also, the number of firing control main processing unit is not limited to 2 as in the present embodiment, and three or more may be used. A greater number thereof will reduce its load.

Fourth Embodiment

Figure 31:
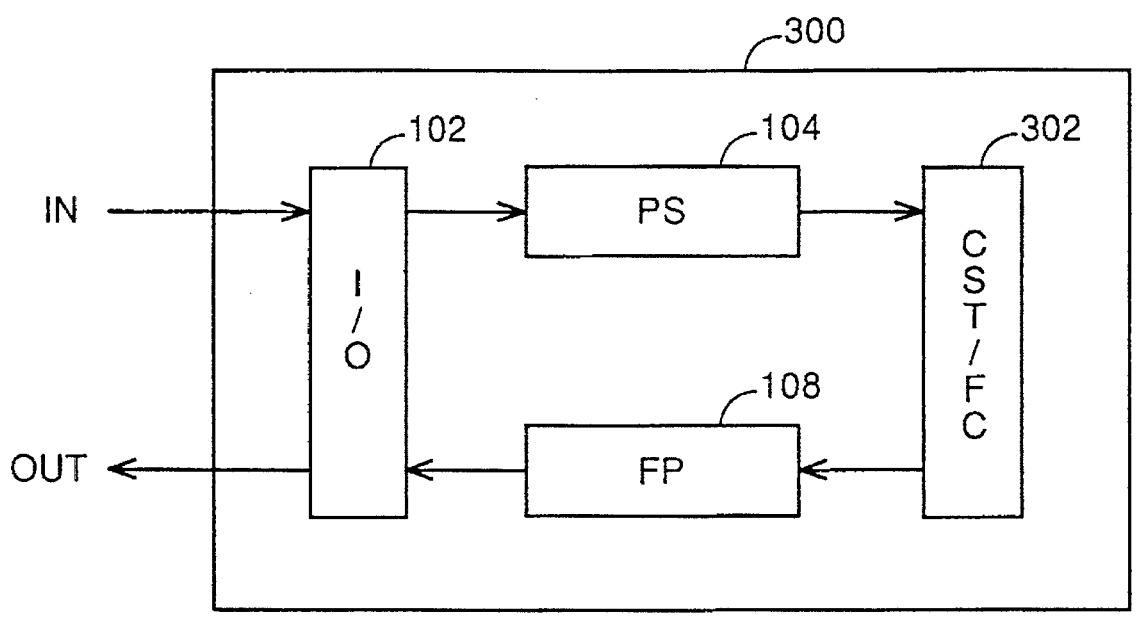
FIG. 31 schematically shows a structure of a data-driven processor according to a fourth embodiment of the present invention.

A data-driven processor 300 of FIG. 31 according to a fourth embodiment differs from those of the first to third embodiments in that a CST/FC 302 is provided instead of CST/FC 106 of FIG. 16, CST 202 of FIG. 21, and CST 222 of FIG. 24, respectively. CST/FC 302 is a modification of the structure of the first embodiment with a plurality of firing control main processing units provided.

More specifically, the data-driven processor of the fourth embodiment has constant data read out from a constant data memory to generate a data pair when a data packet in which the matching party is constant data is applied, and uses a plurality of firing control main processing units in an interleaving manner when the input packet is a 2-input instruction and the argument data of the other party is not a constant. Therefore, the amount of processing of a dynamic data pair generation process is reduced by providing a constant data process. Furthermore, the process can be divided by a plurality of firing control main processing units. Therefore, the possibility of the process of the firing control mechanism becoming a bottleneck of the entire structure in the data-driven processor is reduced by means of CST/FC 302 of the fourth embodiment.

Figure 32:
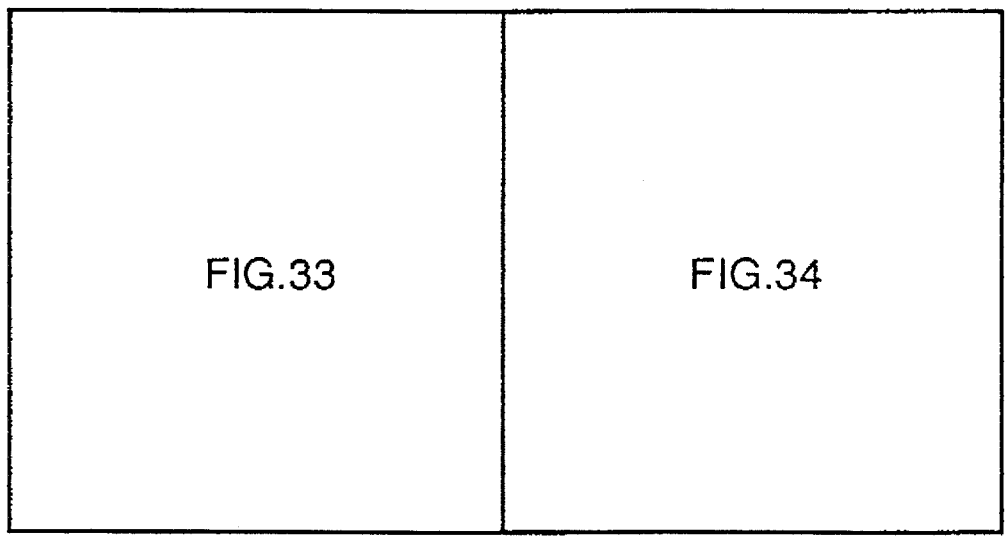
FIG. 32 shows the relationship between FIGS. 33 and 34.
Figure 33:
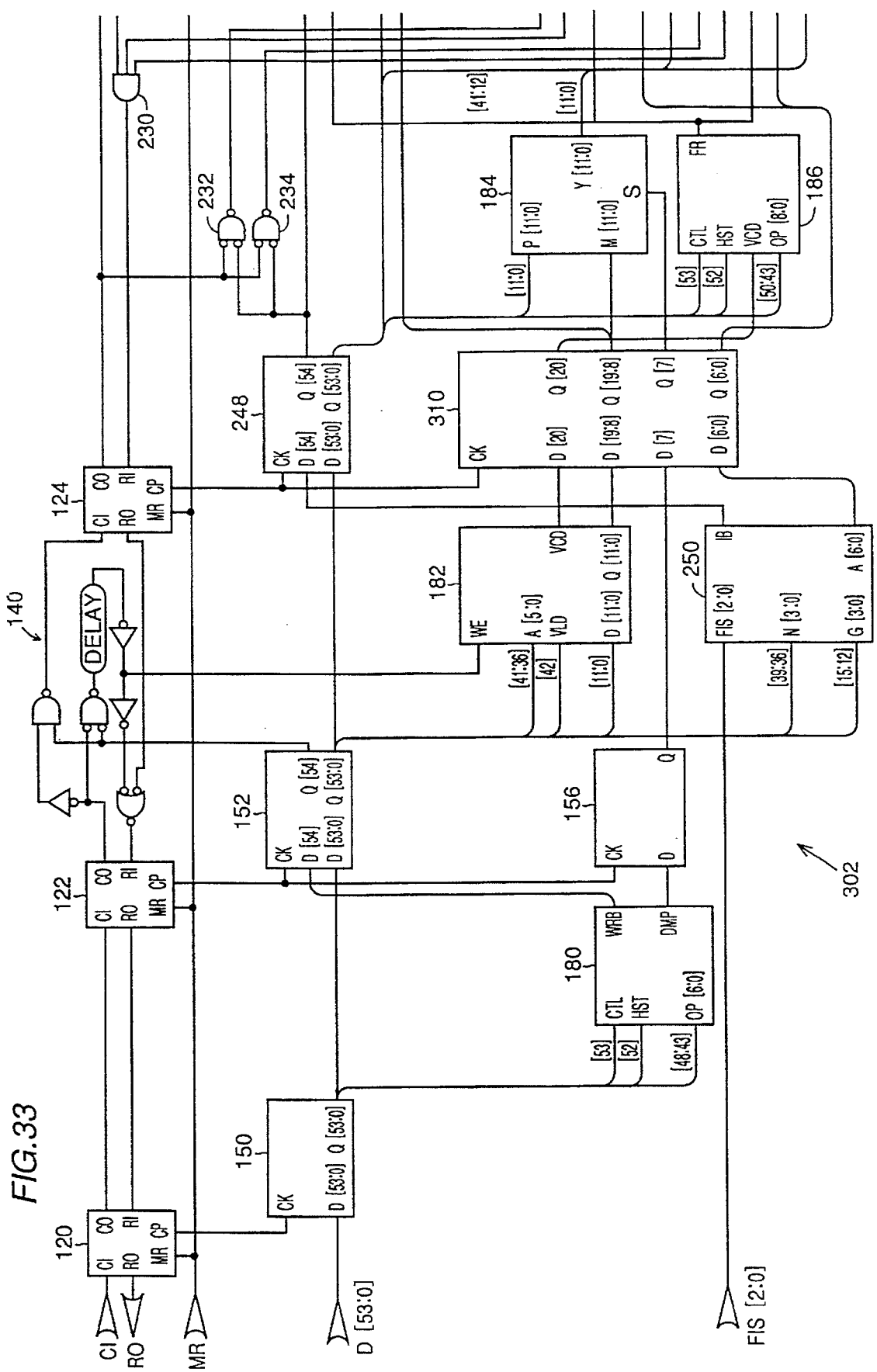
FIGS. 33 and 34 are logic circuit diagram showing one portion and the other portion, respectively, of a dynamic firing control mechanism with constant data memory/interleave processing.
Figure 34:
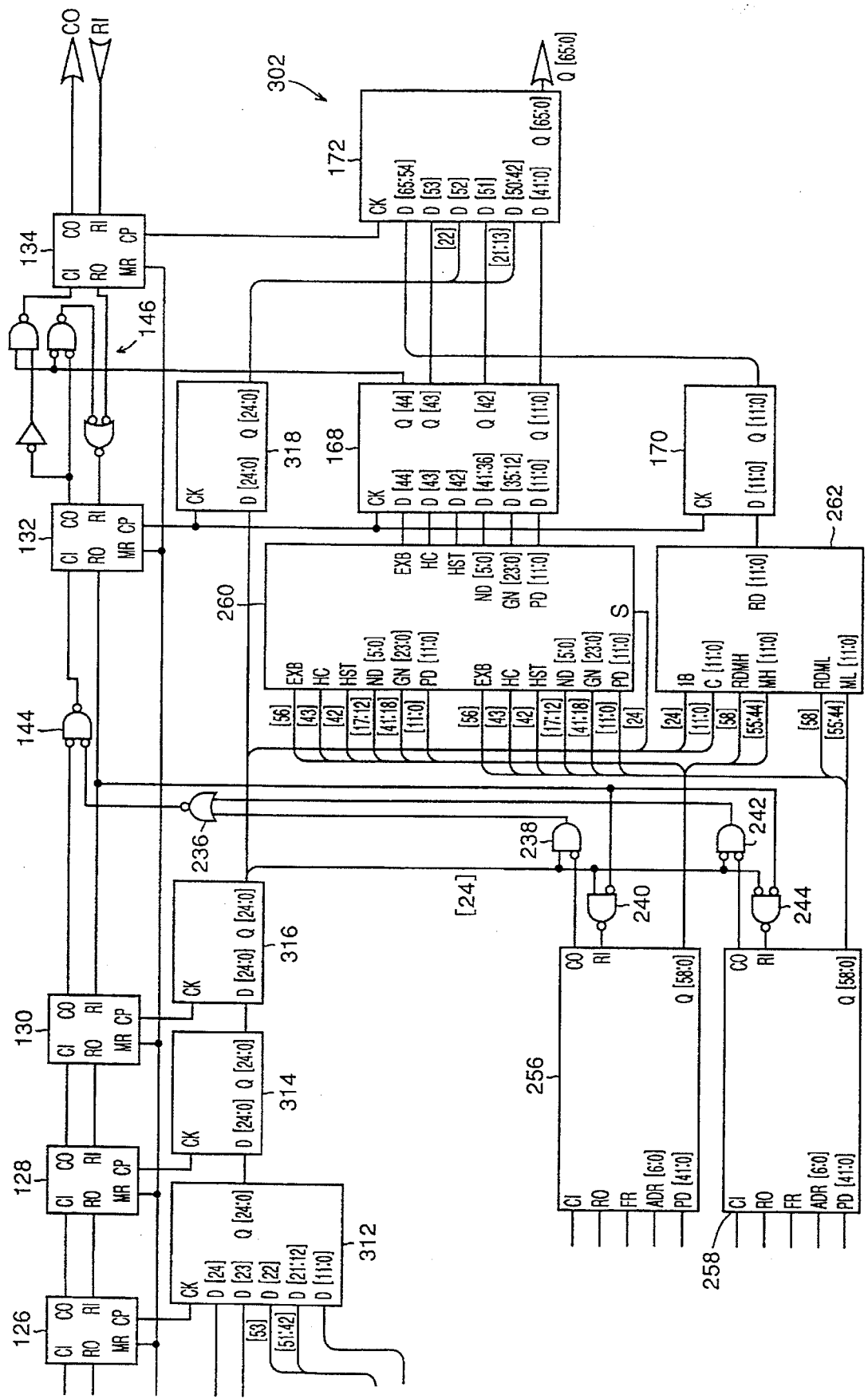

A circuit diagram of CST/FC 302 of the fourth embodiment is shown in FIGS. 33 and 34, which are to be joined as shown in FIG. 32.

Referring to FIGS. 33 and 34, CST/FC 302 includes C-elements 120, 122, 124, 126, 128, 130, 132, and 134, data latches 150, 152, 156, 168, 170, 172, 248, 310, 312, 314, 316 and 318, a load-dump detection unit 180 of a constant data memory, a constant data memory 182, an interleave flag and FC address detection unit 250 in interleaving, a selector 184, an FC-adapted 2-input instruction execution packet detection unit 186, firing control main processing units 256 and 258, a firing control main processing output data selection unit 260, a pair data selection unit 262, transmission control circuits 140 and 146, logic gate circuits 144, 230, 234, 236, 238, 240, 242, and 244. In FIGS. 33 and 34, components corresponding to those shown in FIGS. 18, 19, 22, 26 and 27 have the same reference characters denoted. The functions and labels thereof are also similar. Therefore, their description will not be repeated.

In the data driven processor of the fourth embodiment, CST/FC 302 operates as set forth in the following.

An FIS parameter applied from a terminal FIS shown in FIG. 33 is similar to that of the third embodiment. More specifically, this FIS parameter serves to specify which information of the destination specifying portion of the data packet is used to select a firing control main processing unit when a plurality of firing control main processing units (2 in the present embodiment) are to be used in an interleaving manner.

Interleave flag and FC address detection unit 250 in interleaving generates an IB flag and an address used for accessing the matching memory on the basis of the FIS parameter and information of the destination specifying portion of the input data packet specified by the FIS parameter. Similar to the third embodiment, an IB flag indicates which of the firing control main processing units the input subpacket is to be processed.

FC-adapted 2-input instruction execution packet detection unit 186 detects whether the input packet is a 2-input instruction execution packet or not to generate a flag FR indicating the result of the detection. Flag FR is applied to firing control main processing units 256 and 258 together with an input packet data.

Constant data and a VLD flag are read out from constant data memory 182 using a portion of the destination specifying portion of the input packet regardless of whether the input packet should have the data pair generated by CST or by firing control main processing units 256 and 258. Addressing of constant data memory 182 is carried out using the node number in the present embodiment. The VLD flag takes the value of 1 and 0 when the value of the constant data memory in an appropriate address is 1 and 0, respectively. The constant data and VLD flag are maintained until they enter pair data selection unit (CST/FC data detection unit) 262 and output data selection unit 260 of a firing control main processing unit.

In the present embodiment, firing control main processing units 256 and 258 are selectively operated when flag IB is 1 and 0, respectively, as shown in FIG. 34. It is to be noted that firing control main processing unit 256 or 258 do not operate when flag VLD output from constant data memory 182 is valid. Any of firing control main processing units 256 or 258 operates only when flag VLD is 0.

The process of firing control main processing unit 256 or 258 is similar to that of firing control main processing unit 256 or 258 in the third embodiment. Furthermore, the address generated by interleave flag and FC address detection unit 250 in interleaving is used in accessing the matching memory, as in the third embodiment.

The information output from firing control main processing unit 256 or 258 is subject to a collection/selection process of information required as a packet by output data selection unit 260 of a firing control main processing unit and pair data selection unit 262 to be assembled as a data packet. This assembled data packet is output from CST/FC 302. Here, constant data output from constant data memory 184 or the output of the selected firing control main processing unit 256 or 258 is selected as the pair data of the input packet when flag VLD is 1 and 0, respectively.

Load-dump detection unit 180 of a constant data memory is similar to that of the first and second embodiments. Load-dump detection unit 180 is the processing unit that is used only when the input packet is not an execution packet, and is used only in the case of writing and reading with respect to constant data memory 182. Therefore, the operation of data-driven processor is not affected even if there is no load-dump detection unit 180. However, the usage of load dump-detection unit 180 allows modification and confirmation of the contents of constant data memory 182.

In a data-driven processor of the fourth embodiment, constant data output from a constant data memory is selected as the pair data without having to operate a firing control main processing unit when there is a valid data in the constant data memory. Since a firing control main processing unit operates only when no valid data is stored in the constant data memory, the amount of processing of the firing control main processing unit is reduced. Accordingly, the load of firing control process is reduced. Since a plurality (2 in the present embodiment) of firing control main processing units are provided and used in an interleaving manner based upon the destination information of an input packet, the load of each firing control main processing unit can be divided to improve the entire processing speed of the data-driven processor.

The present invention described above according to various embodiments is not limited to those thereof, and other various modifications can be applied. For example, the circuit structure of a C-element, the manner of storing data in a constant data memory and a matching memory, the method of specification according to an FIS parameter, and the like can be modified appropriately according to the required specification.

According the present invention, the data pair generation process is carried out in a different manner depending upon whether argument data companion to the argument data in an applied token is a constant or not. The load of the generation process of a data pair is reduced. As a result, the speed of a data pair generation process that determines the rate of the processing speed can be improved.

Since the amount of process of a dynamic data pair generation mechanism can be reduced by providing individually a constant data processing unit and a dynamic data generation mechanism, the amount of hardware of a dynamic data pair generation mechanism can be reduced. Furthermore, the hardware of the entire data pair generation processing unit can be reduced, since the hardware for the constant data processing unit is smaller.

When only a constant data processing unit is provided and a dynamic data pair generation mechanism is not used, matching of argument data is carried out using only the constant data processing unit. Therefore, generation of a data pair can be carried out with a smaller amount of processing and at higher speed. The required hardware is also reduced.

When a plurality of dynamic data pair generation mechanisms are provided, the load of the plurality of dynamic data pair generation mechanisms can be divided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data-driven information processing device comprising:

a program storage mechanism for storing a data flow program, a data pair generation mechanism receiving an output of said program storage mechanism for providing an instruction having all argument data for execution available together with its argument data and destination information of the execution result, an operation processing mechanism receiving an output of said data pair generation mechanism for executing an applied instruction and providing the execution result together with applied destination information, a circular pipeline for transferring data among said program storage mechanism, said pair data generation mechanism, and said operation processing mechanism in a token format, and data input/output control means connected to said circular pipeline, wherein said data pair generation mechanism carries out a data pair generation process in different manners according to whether argument data companion to the argument data in an applied token is constant or not, whereby load of a data pair generation process is reduced.

2. The data-driven information processing device according to claim 1, wherein said data pair generation mechanism comprises a constant data processing unit for providing constant data and information representing whether said constant data is valid or not according to destination information in an applied token, a dynamic data pair generation mechanism operating in response to an output of information indicating that the constant data is invalid from said constant data processing unit for matching argument data according to destination information included in the applied token for providing an instruction determined as having all argument data required available and the argument data in said applied token together with the destination of the execution result, and when argument data companion to said argument data in the applied token is matched, providing said companion argument data, and data selection means for selecting constant data output from said constant data processing unit when information is output from said constant data processing unit that the constant data is valid, and for selecting said companion argument data output from said dynamic data pair generation mechanism when information is output from said constant data processing unit indicating that the constant data is invalid to assemble and output a token using information in the applied token.

3. The data-driven information processing device according to claim 2, wherein said constant data processing unit comprises a constant data memory for storing constant data used in an instruction and a valid flag according to an address calculated in reference to an applied node number in an instruction in a data flow program, and means for addressing said constant data memory according to a node number in destination information in an applied token for reading out constant data and a valid flag thereof from said constant data memory.

4. The data-driven information processing device according to claim 3, wherein said data pair generation mechanism further comprises means responsive to an instruction code included in an applied token being a constant data memory load instruction for writing data included in said applied token according to an address in said constant data memory specified in reference to a node number included in said applied token.

5. The data-driven information processing device according to claim 1, wherein said data pair generation mechanism comprises a constant data processing unit for providing constant data used as one input of a 2-input instruction and information representing whether said constant data is valid or not according to destination information in an applied token, and data select means for assembling and providing a token according to information in an applied token and an output of said constant data processing unit.

6. A data-driven information processing device comprising:

a program storage mechanism for storing a data flow program, a data pair generation mechanism receiving an output of said program storage mechanism for providing an instruction having all argument data for execution available together with its argument data and destination information of the execution result, an operation processing mechanism receiving an output of said data pair generation mechanism for executing an applied instruction and providing the execution result together with an applied destination information, a circular pipeline for transferring data among said program storage mechanism, said data pair generation mechanism and said operation processing mechanism in a token format, and data input/output control means connected to said circular pipeline, wherein said data pair generation mechanism comprises a plurality of dynamic data pair generation mechanisms, each of said plurality of dynamic data pair generation mechanisms includes a matching memory for matching argument data to execute an instruction according to destination information in an applied token, for providing an instruction determined as having all argument data required for execution available and argument data in said applied token together with destination of the execution result, and when argument data companion to argument data of said applied token is matched, providing said companion argument data, wherein said data pair generation mechanism further comprises interleave flag and address generation means for generating select information indicating which of said plurality of dynamic data pair generation mechanisms is to be selected and an address used for data matching by a selected dynamic data pair generation mechanism according to an externally applied interleave specifying parameter for interleaving and using said plurality of dynamic data pair generation mechanisms and destination information included in an applied token, and data select means selectively operating any of said plurality of dynamic data pair generation mechanisms according to information in an applied token and select information output from said interleave flag and address generation means for assembling and providing a token using that output and information of the applied token.

7. A data-driven information processing device comprising:

a program storage mechanism for storing a data flow program, a data pair generation mechanism receiving an output of said program storage mechanism for providing an instruction having all argument data for execution available together with its argument data and destination information of the execution result, an operation processing mechanism receiving an output of said data pair generation mechanism for executing an applied instruction and providing the execution result together with an applied destination information, a circular pipeline for transferring data among said program storage mechanism, said data pair generation mechanism, and said operation processing mechanism in a token format, and data input/output control means connected to said circular pipeline, wherein said data pair generation mechanism comprises a constant data processing unit for providing constant data and information representing whether said constant data is valid or not according to destination information in an applied token, and a plurality of dynamic data pair generation mechanisms, each of said plurality of dynamic pair generation mechanisms including a matching memory according to destination information in an applied token for matching argument data required for execution of an instruction, for providing an instruction determined as having all argument data required for execution available and argument data in said applied token together with destination of the execution result, and when argument data companion to the argument data in said applied token is matched, providing that pair companion data, wherein said data pair generation mechanism further comprises select detection unit for making determination which is to be made valid the constant data output from said constant data processing unit or said comparison argument data output from said plurality of dynamic data pair generation mechanisms according to information of the applied token and an output of said constant data processing unit, and providing the determination result, interleave flag and address generation means for generating select information representing which of said plurality of dynamic data pair generation mechanisms is to be selected and an address used for data matching in a selected dynamic data pair generation mechanism according to an externally applied interleave specifying parameter for interleaving and using said plurality of dynamic data pair generation mechanisms, and destination information included in an applied token, and data select means for selectively operating any of said plurality of dynamic data pair generation mechanisms and said constant data processing unit according to information of an applied token, select information output from said interleave flag and address generation means, and an output of said select detection unit, for assembling and providing a token using that output and information of an applied token.

\* \* \* \* \*